(12) United States Patent
Jayasimha et al.

(10) Patent No.: US 8,868,941 B2
(45) Date of Patent: Oct. 21, 2014

(54) APPARATUS AND METHODS FOR AN INTERCONNECT POWER MANAGER

(75) Inventors: Doddaballapur N. Jayasimha, Sunnyvale, CA (US); Drew E. Wingard, Palo Alto, CA (US); Stephen W. Hamilton, Pembroke Pines, FL (US)

(73) Assignee: Sonics, Inc., Milpitas, CA (US)

( * ) Notice: Subject to any disclaimer, the term of this patent is extended or adjusted under 35 U.S.C. 154(b) by 296 days.

(21) Appl. No.: 13/434,605

(22) Filed: Mar. 29, 2012

(65) Prior Publication Data

US 2013/0073878 A1     Mar. 21, 2013

Related U.S. Application Data

(60) Provisional application No. 61/536,459, filed on Sep. 19, 2011.

(51) Int. Cl.
| | | |
|---|---|---|
| *G06F 1/00* | (2006.01) | |
| *G06F 1/32* | (2006.01) | |
| *G06G 7/54* | (2006.01) | |
| *G06F 13/00* | (2006.01) | |
| *G06F 15/00* | (2006.01) | |

(52) U.S. Cl.
CPC ............. *G06F 1/3287* (2013.01); *Y02B 60/32* (2013.01)
USPC ............. 713/300; 713/320; 713/324; 703/18; 710/104; 712/28; 712/32

(58) Field of Classification Search
USPC ............. 713/300, 320, 324; 703/18; 710/104; 712/28, 32
See application file for complete search history.

(56) References Cited

U.S. PATENT DOCUMENTS

| | | |
|---|---|---|
| 2,852,913 A | 9/1958 | Jorgensen et al. |
| 3,252,283 A | 5/1966 | Jackson et al. |

(Continued)

FOREIGN PATENT DOCUMENTS

| | | |
|---|---|---|
| WO | WO 2012/030787 | 3/2012 |
| WO | WO 2013/043324 A1 | 3/2013 |

OTHER PUBLICATIONS

Notification of Transmittal of The International Search Report and The Written Opinion of the International Searching Authority dated Nov. 6, 2012 for International Patent Application No. PCT/US2012/052661, International Filing Date Aug. 28, 2012, 11 pages, International Searching Authority/U.S., Alexandria, Virginia USA.

(Continued)

*Primary Examiner* — Stefan Stoynov
(74) *Attorney, Agent, or Firm* — Rutan & Tucker, LLP

(57) ABSTRACT

An interconnect-power-manager (IPM) cooperates and communicates signals with an integrated-circuit-system-power-manager (SPM) in the integrated-circuit. The interconnect network (IN) is partitioned into multiple power domains and has hardware circuitry integrated into the IN to manage a quiescent state for all components in each power domain in the IN when a routing pathway for transactions in the IN spans across one or more power domain boundaries and causes interdependencies of power domains within the IN other than where the power domains of the initiator agent and final target agent of the transaction are located within. The SPM is configured to cooperate and communicate with the IPM to quiesce, to wake up, and any combination of the two, one or more of the multiple power domains within the IN.

23 Claims, 12 Drawing Sheets

(56) References Cited

U.S. PATENT DOCUMENTS

| | | | |
|---|---|---|---|
| 4,354,345 | A | 10/1982 | Dreisbach, Jr. et al. |
| 5,110,269 | A | 5/1992 | Fallon |
| 5,339,636 | A | 8/1994 | Donnelly et al. |
| 5,899,058 | A | 5/1999 | Narcus et al. |
| 5,948,089 | A | 9/1999 | Wingard et al. |
| 6,145,318 | A | 11/2000 | Kaplan et al. |
| 6,182,183 | B1 | 1/2001 | Wingard et al. |
| 6,330,225 | B1 | 12/2001 | Weber et al. |
| 6,357,219 | B1 | 3/2002 | Dudd, Jr. et al. |
| 6,578,117 | B2 | 6/2003 | Weber |
| 6,725,313 | B1 | 4/2004 | Wingard et al. |
| 7,051,306 | B2* | 5/2006 | Hoberman et al. .......... 716/127 |
| 7,120,712 | B2 | 10/2006 | Wingard et al. |
| 7,325,050 | B2 | 1/2008 | O'Connor et al. |
| 7,325,221 | B1 | 1/2008 | Wingard |
| 7,415,680 | B2 | 8/2008 | Hoberman et al. |
| 7,610,572 | B2* | 10/2009 | Kanno et al. ................. 716/138 |
| 7,644,293 | B2 | 1/2010 | Sistla et al. |
| 7,659,746 | B2* | 2/2010 | Chua-Eoan et al. ............ 326/83 |
| 7,761,696 | B1 | 7/2010 | Bhattacharyya et al. |
| 7,844,840 | B2 | 11/2010 | McShane et al. |
| 7,997,062 | B2 | 8/2011 | Sun et al. |
| 8,190,804 | B1 | 5/2012 | Srinivasan et al. |
| 8,365,132 | B2* | 1/2013 | Hsu et al. ..................... 716/133 |
| 2002/0129173 | A1 | 9/2002 | Weber et al. |
| 2003/0004699 | A1 | 1/2003 | Choi et al. |
| 2003/0074520 | A1 | 4/2003 | Weber et al. |
| 2004/0177186 | A1 | 9/2004 | Wingard et al. |
| 2005/0010890 | A1 | 1/2005 | Nehmadi et al. |
| 2005/0276132 | A1 | 12/2005 | Severson et al. |
| 2007/0094429 | A1 | 4/2007 | Wingard et al. |
| 2007/0198756 | A1 | 8/2007 | Norgaard |
| 2008/0136641 | A1 | 6/2008 | Kean |
| 2008/0301708 | A1 | 12/2008 | Hamilton |
| 2008/0307238 | A1 | 12/2008 | Bieswanger et al. |
| 2008/0320476 | A1 | 12/2008 | Wingard et al. |
| 2009/0152948 | A1 | 6/2009 | Hoberman et al. |
| 2009/0204834 | A1* | 8/2009 | Hendin et al. ................ 713/323 |
| 2009/0254525 | A1 | 10/2009 | Srinivasan et al. |
| 2009/0293061 | A1 | 11/2009 | Schwinn et al. |
| 2010/0174923 | A1 | 7/2010 | Houlihan et al. |
| 2010/0318822 | A1 | 12/2010 | Scandurra et al. |
| 2011/0283130 | A1* | 11/2011 | Pai et al. ..................... 713/330 |
| 2012/0036509 | A1 | 2/2012 | Srinivasan et al. |
| 2012/0117301 | A1 | 5/2012 | Wingard |

OTHER PUBLICATIONS

Notification of Transmittal of The International Search Report and The Written Opinion of the International Searching Authority dated Jan. 18, 2012 for International Patent Application No. PCT/US2011/049673, International Filing Date Aug. 30, 2012, 11 pages, International Searching Authority/U.S., Alexandria, Virginia USA.

Non-Final Office Action for U.S. Appl. No. 12/873,013 mailed Sep. 25, 2012, 18 Pages. U.S. Patent & Trademark Office, Alexandria, Virginia USA.

Wingard, D., "Socket-Based Design Using Decoupled Interconnects," *Interconnect-Centric Design for Advanced SOC and NOC*, Chapter 14, (2002) 30 pages.

Weber, Wolf-Dietrich, "Efficient Shared DRAM Subsystems for SOC's", Sonics, Inc., (2001) 6 pages.

OCP (Open Core Protocol) Specification, Release 2.0, OCP International Partnership, (2003) OCP-IP Association, pp. 210 total.

Wingard, Drew, "A Non-Blocking Intelligent Interconnect for AMBA-Connected SoCs," Sonics, Inc., Co-Ware ARM Developer's Conference, (Oct. 2005) 39 pages.

Weber, Wolf-Dietrich et al., "A Quality-of-Service Mechanism for Interconnection Networks in System-on-Chips," 1530-1591/05, (2005) IEEE, 6 pages.

Wingard, Drew, "Tiles: The Heterogeneous Processing Abstraction for MPSOC", Jul. 2004, pp. 1-35.

Wingard, Drew, "Sonics SOC Integration Architecture," Sonics, Inc., 1999, 25 pages.

Kamas, Alan, "An Overview of the SystemC Models for the Open Core Protocol," 2004, 30 pages.

IEM Technology Overview, ARM Intelligent Energy Manager (IEM) Technology, 2008, 3 pages.

Mazzoni, Luca, "Power Aware Design," IEE Electronics Systems and Software, Oct./Nov. 2003, 6 pages.

"A Configurable Multi-standard Video Decoding Subsystem for Low-power, Low-cost Application," The ARC Subsystem, Nov. 2005, 8 pages.

White Paper for "eXtreme Energy Conservation: Advanced Power-Saving Software for Wireless Devices," Freescale Semiconductor, Rev. #0, Feb. 2006, 15 pages.

White Paper for "Technologies for Optimized Power Management," Freescale Semiconductor, Ref. #0, Feb. 2006, 10 pages.

Flautner, K., et al., "Vertigo: Automatic Performance-Setting for Linux," IEMSoftware Paper OSDI, 2002, 12 pages.

ARM Flyer, National Semiconductor, 2002, 4 pages.

Flautner, K., et al., "A Combined Hardware-Software Approach for Low-Power Socs: Applying Adaptive Voltage Scaling and Intelligent Energy Management Software," DesignCon 2003, National Semiconductor Corp., 17 pages.

Zarr, Richard, "PowerWise Solutions and the Future of Energy Utilization," National Semiconductor, Sep. 2007, 3 pages.

Carlson, Brian, SmartReflex Power and Performance Management, White Paper, 2005, 8 pages.

Wu, Qiang, et al., Formal Online Methods for Voltage Frequency Control in Multiple Clock Domain Microprocessors, ASPLOS, Oct. 2004, 12 pages.

Juang, Philo, et al., "Coordinated, Distributed, Formal Energy Management of Chip Multiprocessors," ISLPED '05, Aug. 2005, 4 pages.

Isci, Canturk, et al., "An Analysis of Efficient Multi-Core Global Power Management Policies: Maximizing Performance for a Given Power Budget," IBM Research, 2006, 12 pages.

Yonker, Mike, White Paper for "How Mobile Operators Can Monetize 3G Investments Through an Effective Applications Platform," Texas Instruments, 2006, 10 pages.

Bainbridge, John, "A Secret Weapon", Nov. 17, 2011 jbainbridge Comments as featured in: sonicsinc.com/blog. Downloaded from http://www.sonicsinc.com/blog/?tag=axi, 2 pages.

Communication Action for European Patent Application No. 12833635.1 mailed Apr. 28, 2014, 3 pages. European Patent Office, Munich, Germany.

Non-Final Office Action for U.S. Appl. No. 12/873,013 mailed Sep. 25, 2012, 13 pages. U.S. Patent & Trademark Office, Alexandria, Virginia USA.

Final Office Action for U.S. Appl. No. 12/873,013 mailed Mar. 7, 2013, 10pgs. U.S. Patent and Trademark Office, Alexandria, Virginia, USA.

Merkel, Andreas, et al, "Balancing Power Consumption in Multiprocessor Systems," EuroSys, 2006, 12 pages.

\* cited by examiner

APPARATUS AND METHODS FOR AN INTERCONNECT POWER MANAGER

RELATED APPLICATIONS

This application is related to and claims the benefit of U.S. Provisional Patent Application Ser. No. 61/536,459, titled "A FLEXIBLE NETWORK ON A CHIP," filed Sep. 19, 2011.

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to power management. More particularly, an aspect of an embodiment of the invention relates to an interconnect-power-manager for an interconnect network with multiple power domains located within an integrated circuit.

BACKGROUND OF THE INVENTION

A System-on-a-Chip design may have a need for lower power consumption, multiple clock domains, and multiple power domains. These domains enable power reduction by switching off local supplies to eliminate leakage current, dynamically scaling voltages and clocks (especially in processing subsystems such as CPUs, GPUs and video engines) to optimize active power for operating conditions and altering IP core clocks to meet the needs of application usage scenarios. Nonetheless, the integrated-circuit-system-power-manager turns different functional blocks on and off to achieve some of the above functions, the communications network between different functional block is typically left powered on while these other functional blocks are put into a sleep mode or idle state. Typically, the system-power-manager does both functions of control activity in power domains in order to turn off or power on a given power domain.

SUMMARY OF THE INVENTION

Various methods and apparatus are described for an integrated circuit including one or more initiator Intellectual Property (IP) cores, one or more target IP cores, and an interconnect network. An interconnect-power-manager has hardware circuitry and signaling ports configured to cooperate and communicate with an integrated-circuit-system-power-manager as well as with different agents within an interconnect network for the integrated circuit. The interconnect network is partitioned into multiple power domains. The interconnect-power-manager has the hardware circuitry integrated into the interconnect network to manage a quiescent state for all components in the interconnect network in each power domain when a routing pathway for transactions in the interconnect network spans across one or more power domain boundaries and causes interdependencies of power domains within the interconnect network other than the locations of the power domains containing an initiator agent generating a new transaction and a final target agent of the new transaction. One or more initiator cores each couple to their own corresponding initiator agent. One or more target cores each couple to their own corresponding target agent. The different initiator and target cores have their power state managed by the integrated-circuit-system-power-manager, which is separate than the interconnect-power-manager managing the multiple power domains of the interconnect network. The integrated-circuit-system-power-manager is configured to cooperate and communicate with the interconnect-power-manager 1) to quiesce, 2) to wake up, and 3) any combination of the two, one or more of the multiple power domains within the interconnect network. Each power domain is separately controllable from other power domains in the interconnect network by the interconnect-power-manager.

BRIEF DESCRIPTION OF THE DRAWINGS

The drawings refer to embodiments of the invention in which.

Figure 1:
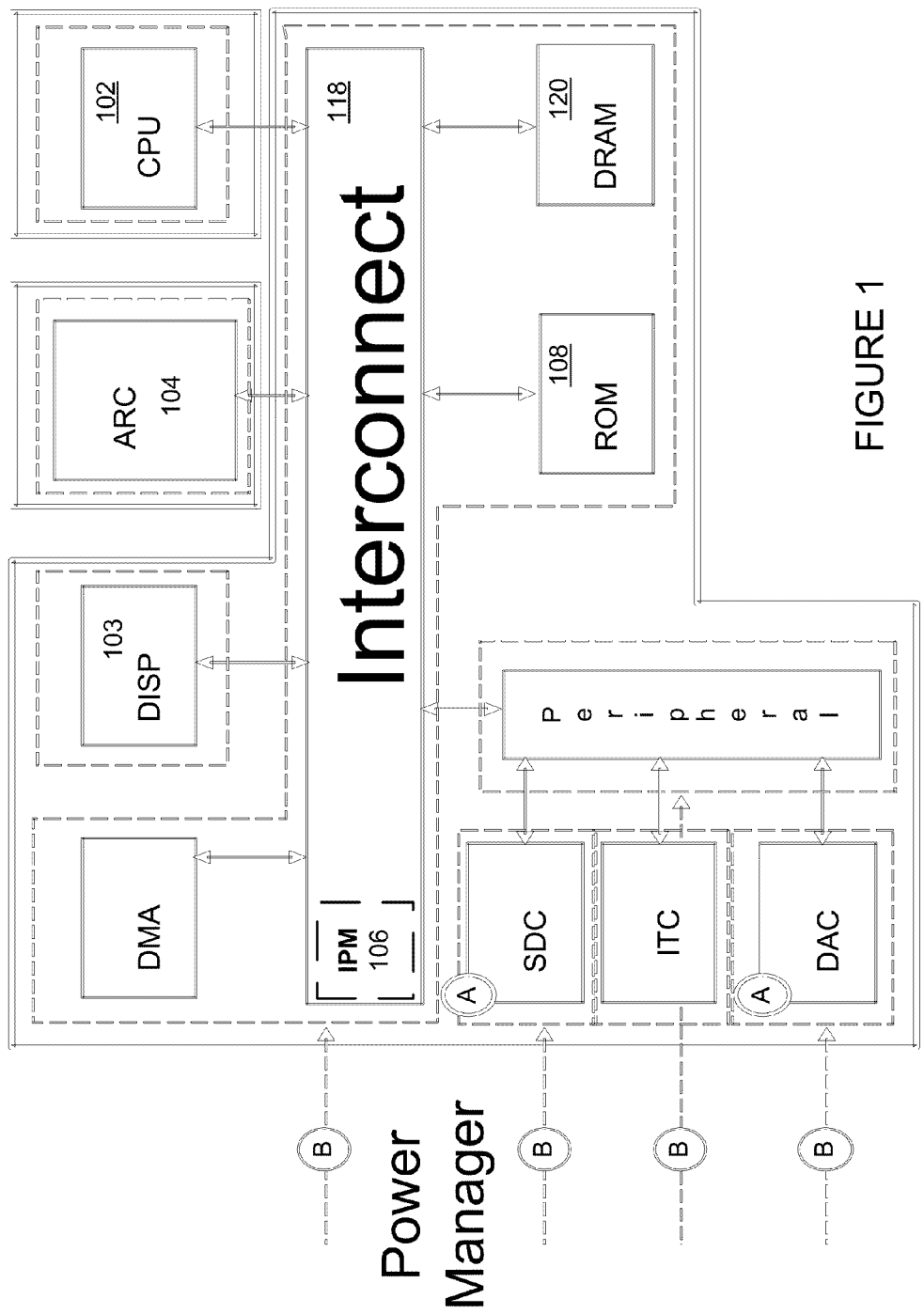
FIG. 1 illustrates a block diagram of an embodiment of a System-on-a-Chip having multiple initiator IP cores and multiple target IP cores that communicate transactions, such as read and write request transactions, burst request transactions, response transactions, etc., over the interconnect network.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of power domains within an integrated circuit, etc., in order to provide a thorough understanding of the present invention. However, it will be apparent to a person of ordinary skill in the art that the present invention may be practiced without these specific details. In other instances, well known components or methods have not been described in detail, but rather in a block diagram in order to avoid unnecessarily obscuring the present invention. Further, specific numeric references, such as first target, may be made. However, the specific numeric reference should not be interpreted as a literal sequential order, but rather interpreted that the first target is different than a second target. Thus, the specific details set forth are merely exemplary. The specific details may be varied from, and still be contemplated to be, within the spirit and scope of the present invention.

Some embodiments include systems, methods, and apparatus to manage power in an integrated circuit. An interconnect-power-manager cooperates and communicates signals with an integrated-circuit-system-power-manager in the integrated circuit. The interconnect network is partitioned into multiple power domains and has hardware circuitry integrated into the interconnect network to manage a quiescent state for all components in each power domain in the interconnect network when a routing pathway for transactions in the interconnect network spans across one or more power domain boundaries and causes interdependencies of power domains within the interconnect network other than where the power domains of an initiator agent of a new transaction and final target agent of the new transaction are located within. A power state of one or more initiator cores coupled to their own corresponding initiator agent and one or more target cores coupled to their own corresponding target agent have their power state managed by the integrated-circuit-system-power-manager, which is separate than the interconnect-power-manager. The integrated-circuit-system-power-manager is configured to cooperate and communicate with the interconnect-power-manager to quiesce, to wake up, and any combination of the two, one or more of the multiple power domains within the interconnect network. Each power domain is separately controllable from other power domains in the interconnect network by the interconnect-power-manager to allow for flexible power management control by the external integrated-circuit-system-power-manager cooperating and interfacing with the interconnect-power-manager.

Most aspects of the invention may be applied in most networking environments and an example integrated circuit such as a System-on-a-Chip environment will be used to flush out these aspects of the invention.

FIG. 1 illustrates a block diagram of an embodiment of a System-on-a-Chip having multiple initiator IP cores and multiple target IP cores that communicate transactions, such as read and write requests, burst requests, etc., as well as responses to those request transactions over the interconnect network. Each initiator IP core, such as a CPU IP core 102, ARC core 104, a Digital display IP core 103, DMA engine IP core, DAC IP core, and other similar IP cores may have its own initiator agent to interface that IP core to the remainder of the interconnect network 118. Each target IP core, such as a first DRAM IP core 120 or a Read Only Memory IP Core 108, may have its own target agent to interface that IP core to the remainder of the interconnect network 118. Each DRAM IP core 120 may have an associated memory scheduler as well as DRAM controller. The interconnect network 118 is used to communicate and route the transactions between these multiple initiator IP cores and the one or more target IP cores in the integrated circuit. An integrated-circuit-system-power-manager generally controls the power domains containing the different initiator and target IP cores in the integrated circuit. However, the interconnect network 118 itself may be partitioned into having its own multiple power domains which are controlled by the interconnect-power-manager 106 cooperating with the integrated-circuit-system-power-manager. The Interconnect network 118 can be partitioned into these multiple domains to allow for flexible power management control by the external integrated-circuit-system-power-manager cooperating and interfacing with the interconnect-power-manager 106. The interconnect network spans multiple power domains. Pieces of the interconnect network are implemented in a set of power domains, each of which may include other, non-interconnect logic and components. Each such partition of the interconnect, may be a unique power domain within the chip ("its own power domain"), or it may be part of an existing power domain that includes some initiator IP core logic and/or target IP core logic.

The interconnect-power-manager 106 may cooperate with the integrated-circuit-system-power-manager to decouple activity management from power management in the multi-domain interconnect. The interconnect-power-manager can be configured to control transaction activity management within the multiple power domains within the interconnect network by sending one or more signals to either quiesce or awaken the interconnect network components contained within these multiple power domains. The integrated-circuit-system-power-manager is configured to turn power on and off to the multiple power domains within the interconnect network. The integrated-circuit-system-power-manager turns off power to a given power domain when all of the components within that given power domain in the integrated circuit are quiesced. The components in the interconnect network are quiesced, which includes being temporarily rendered inactive/idle by following a command from the interconnect-power-manager. The interconnect-power-manager decouples transaction activity management in the multiple power domains from the integrated-circuit-system-power-manager's control of power management in order to allow interconnect network components to be contained in two or more power domains along with at least one of 1) an initiator Intellectual Property core, 2) a target IP core, and 3) any combination of both within each of those two or more power domains. See FIG. 6 for an example state machine flow and FIG. 7 for an example timing sequence.

Figure 2:
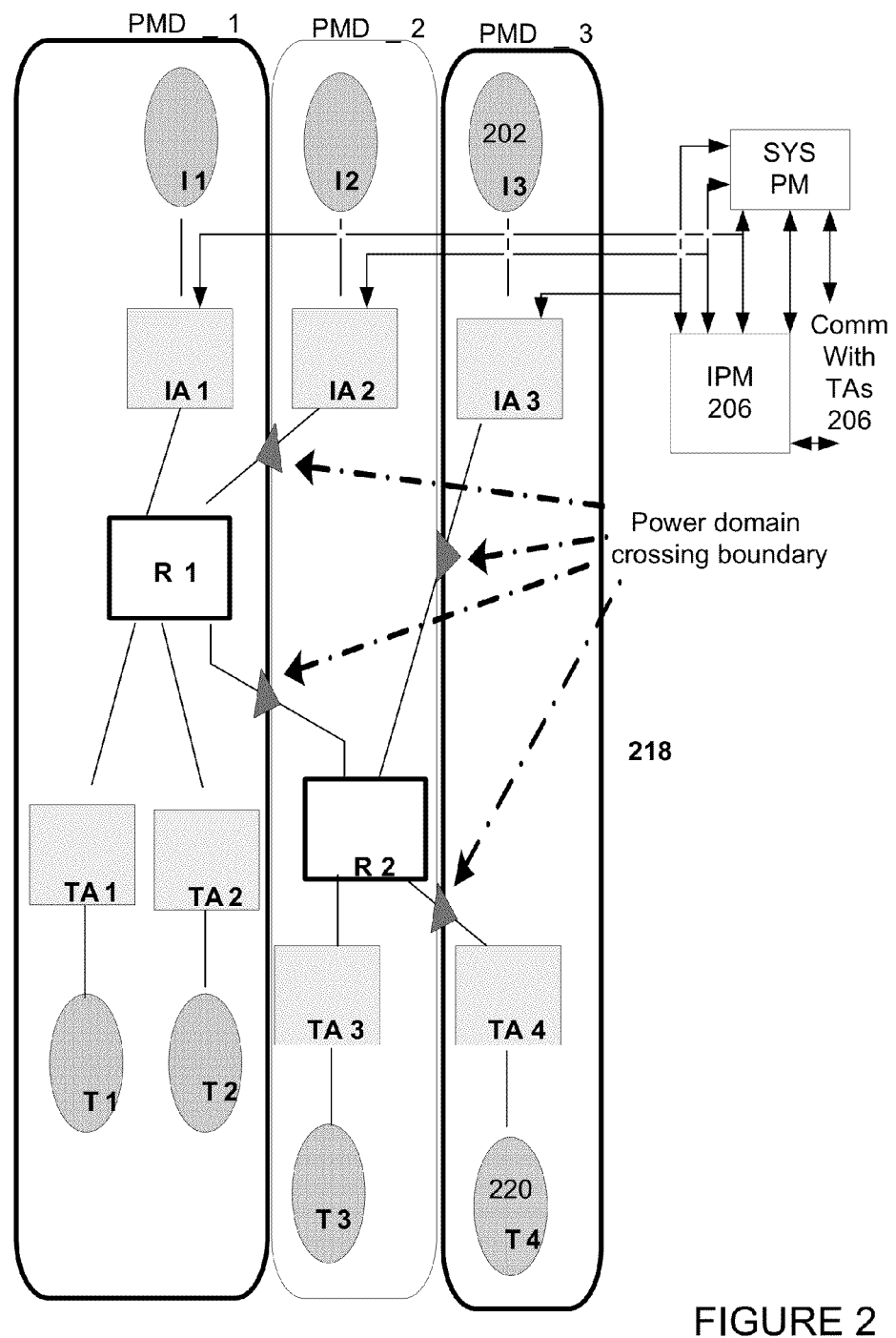
FIG. 2 illustrates a block diagram of a simple embodiment of an interconnect network that has multiple power domains in which a routing pathway for transactions in the interconnect network spans across one or more power domain boundaries.

FIG. 2 illustrates a block diagram of a simple embodiment of an interconnect network that has multiple power domains in which a routing pathway for transactions in the interconnect network spans across one or more power domain boundaries. The Interconnect network 218 may couple transactions between the multiple initiator IP cores, such as CPU IP core 202, and the multiple target IP cores such as a DRAM IP core 220.

The example interconnect network 218 uses two routers R1 and R2 to achieve the desired connectivity between the multiple initiator IP cores and the multiple target IP cores. The integrated circuit including the interconnect network is partitioned into three example power domains. Each power domain has an example set of components within that power domain as shown in the table in FIG. 9. For example, the user has programmed in that the first power domain contains the initiator IP core I1, initiator agent IA1, target agent TA1, target IP core T1, target agent TA2, target IP core T2, and router R1. Another power domain contains the initiator IP core I3, initiator agent IA3, target agent TA4, and target IP core T4. The power domain may contain system components, such as an initiator core, as well as components within the interconnect network itself. The components within a given power domain may be stored in a table in the power domain controller or be supplied as configuration variables into software in the EDA tools which then generates the appropriate combinational logic to account for the components in a given domain (See FIG. 10).

The interconnect network 218 is partitioned into multiple power domains in the integrated circuit and has integrated hardware circuitry in an interconnect-power-manager to manage a quiescent state for all interconnect network components in each power domain in the interconnect when a routing pathway for transactions in the interconnect network 218 spans across one or more power domain boundaries and causes interdependencies of power domains within the interconnect network 218 other than where the power domains of an initiator agent of a new transaction and final target agent of the new transaction are located within. Thus, the interconnect-power-manager 206 may be configured to manage a quiesce state of the interconnect components in the power domain, not for all of the components on the IC in the power domain. For example, to complete a sending of a new request transaction from initiator core 12 to target IP core T4 requires components in three different power domains to be powered up, and three power domain boundary crossings. The new request transaction from initiator core 12 in the second power domain needs to traverse to initiator agent IA2 and then across a power domain boundary to router R1, then back across a power domain boundary to router R2, and then across another a power domain boundary to target agent 4, and then onto target IP core 4. Likewise, a response transaction from target agent 4 to initiator IP core I3 requires two power domain crossings within the interconnect network even though to the integrated-circuit-system-power-manager those two IP cores are in the same power domain, PMD-3. Each initiator core coupled to its initiator agent and each target core coupled to its target agent have their power state managed by an integrated-circuit-system-power-manager, which is separate than the interconnect-power-manager 206 managing the multiple power domains of the interconnect network 218. The interconnect-power-manager 206 has hardware circuitry and signaling ports configured to cooperate and communicate with the integrated-circuit-system-power-manager and different agents within the interconnect network 218. The integrated-circuit-system-power-manager cooperates and communicates with the interconnect-power-manager 206 to quiesce and wake up one or more power domains within the interconnect network 218. The multiple power domains of the interconnect network as well those containing the IP cores themselves are controllable by the integrated-circuit-system-power-manager component, which is external to the interconnect network 218.

A relevant initiator agent set for a particular power domain, such as power domain_k, may be as follows. This relevant initiator agent set is comprised of a) initiator agents in power domain_k, b) initiator agents which communicate with the target agents in power domain_k, and c) initiator agents which use routers in power domain_k to communicate with target agents (based on the connectivity matrix). Combinational logic and status registers in each initiator agent can be used to represent the relevant initiator agent set for a power domain. The integrated-circuit-system-power-manager may control power management within the interconnect network by monitoring only status registers located within each of the initiator agents. The status registers indicate a composite of the quiescent state for all interconnect network components including initiator agents, target agents, and routers in each power domain in the interconnect network that have connectivity to that initiator agent.

The states of quiescing/idling of a given component may be thought of as the same. The logic in the interconnect-power-manager 206 and each of the initiator agents, such as initiator agent IA3, is configured to track a quiescent state of components and routing interdependencies of other power domains in the interconnect network 218 needed to route a transaction between that initiator agent to other target and initiator cores connected to that initiator agent on a per power domain basis.

The hardware circuitry within the interconnect-power-manager 206 Awakens and quiesces the multiple power domains within the interconnect network 218. The interconnect-power-manager 206 also has signaling interfaces with other target IP cores, initiator IP cores, and interconnect network components. The integrated-circuit-system-power-manager manages the power domains where the IP target cores, initiator cores and interconnect network components are located within. The advanced partitioning of sections of the interconnect network 218 allows efficient power management of the multiple power domains in the system on the chip, where each power domain in the interconnect network 218 is separately controllable from other power domains in the interconnect network 218 by the interconnect-power-manager 206. In an embodiment, the interconnect-power-manager 206 does not control voltage supply or clocks to those domains. It only controls whether new activity is permitted to enter those domains.

The interconnect-power-manager 206 may include 1) logic within itself including a network of state machines dispersed throughout the interconnect network, 2) logic within itself including a network of state machines located all in a single location within the interconnect network, 3) logic and registers in the initiator agents dispersed throughout the interconnect network, 4) logic and signaling ports in the connection protocol controllers at link interfaces such as PL, OCP, & AXI, and 5) any combinations of these implementations. In an embodiment, the set of power domain controllers (PDCs) with their interfaces form the interconnect-power-manager 206. The PDCs themselves are connected amongst each other. In an embodiment, the logic and registers associated with each initiator agent may be dispersed throughout the network with the initiator agents or put into one central location and not dispersed.

Figure 3:
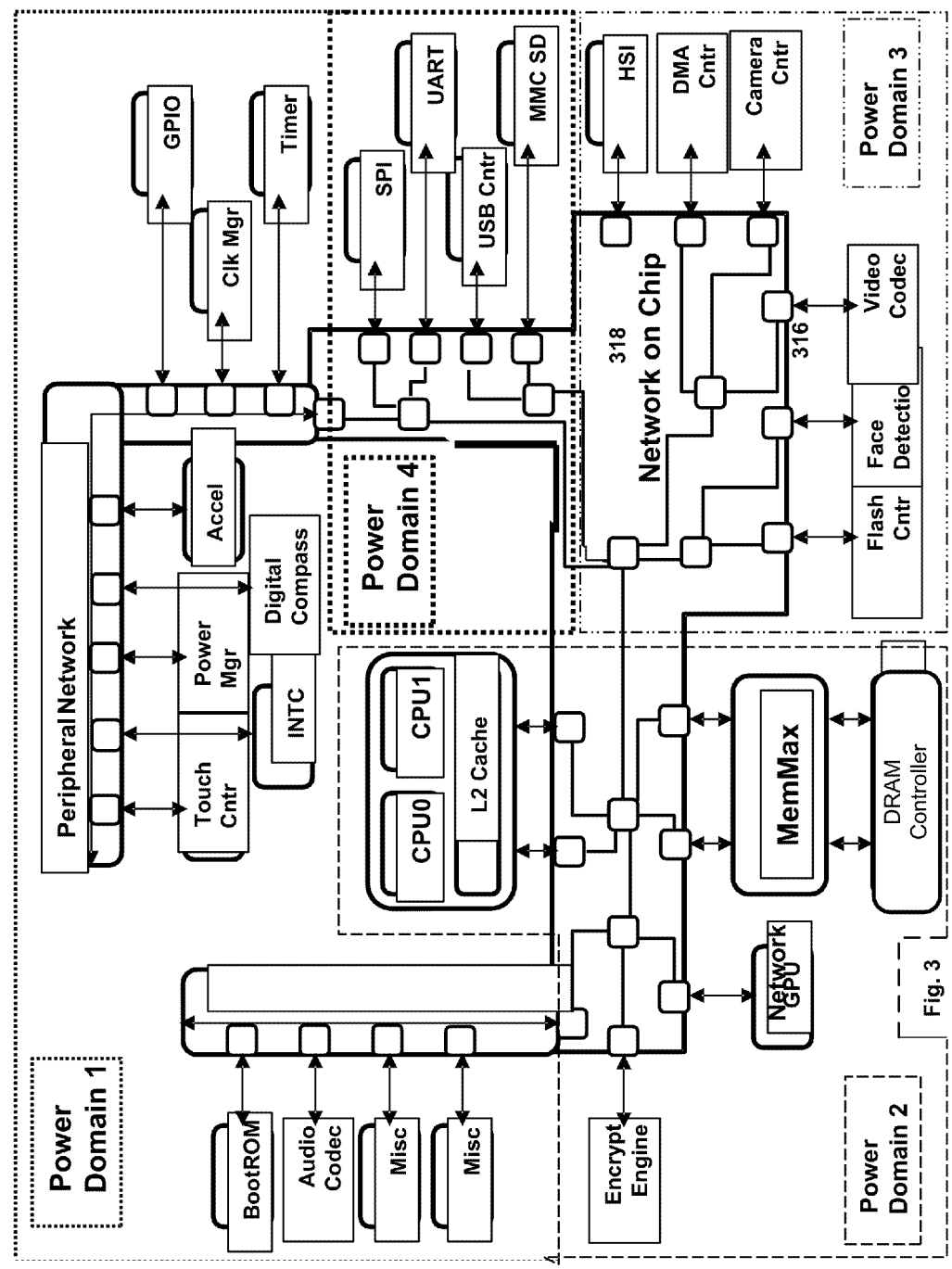
FIG. 3 illustrates a block diagram of a more complex embodiment of an interconnect network that has multiple power domains in which a routing pathway for transactions in the interconnect network spans across one or more power domain boundaries.

As discussed, FIG. 2 shows an example power domain partitioning of multiple separate power domains within the interconnect network. The components of the interconnect network itself and the initiator and target IP cores are distributed among three distinct power domains as shown in FIG. 2 and the table in FIG. 9. FIG. 3 shows another partitioning of the IP cores and interconnect network into four power domains. Components can be partitioned into domains in the system on a chip and internally within the interconnect network along several axes—clock, reset, power, and voltage. Reset and power domains may generally be identical. A hardware reset is associated with each power domain. The reset can be asserted, for example, when the power domain is turned on or awakened. Each power domain may be an indivisible unit for managing transfer activity that is related to externally visible transactions, and this unit provides starting and stopping of this transfer activity at burst boundaries. Each power domain can contain a designer identified set of interconnect components, routers/arbitration units, initiator agents/socket interfaces, and target agents/socket interfaces which naturally should be quiesced or woken up/awakened together as defined by the designer of the integrated circuit. Each power domain is partitioned based on the variable given by the designer, however, the interconnect power manager 206 is aware of connectivity of different IP cores and the routing pathways between the IP cores and thus the interdependencies of components in power domains other than where the transaction starts and the final destination of the transaction. Based on this specification and the connectivity of the IP cores in the integrated circuit, the power domain interdependencies of the interconnect components for a transaction completion are derived.

The interconnect network 218 may have two power management interfaces for each power domain—one at the interconnect power manager 206 and another at the agent. As discussed, the interconnect-power-manager 206 is a module that interfaces externally with the integrated-circuit-system-power-manager and handles the quiescing and waking up of the components in the power domains within the interconnect network 218. The integrated-circuit-system-power-manager is external to the interconnect and interfaces with the interconnect network 218 power manager through a set of PM interface signals per power domain. Thus, the integrated-circuit-system-power-manager interacts with the interconnect network 218 power manager to coordinate power domain state transitions.

The interconnect-power-manager 206 generally includes multiple power domain controllers, such as state machines, one per domain. In an embodiment, the interconnect-power-manager 206 includes the additional logic and registers within each initiator agent as well.

FIG. 3 illustrates a block diagram of a more complex embodiment of an interconnect network that has multiple power domains in which a routing pathway for transactions in the interconnect network spans across one or more power domain boundaries. The system has four power domains, power domains 1-4, and the components are selectably placed by the designer into the different power domains. The various portions of the interconnect network 318 and its agents, such as a first agent 316, will logically fall into those domains. However, the interconnect power manager also uses its connectivity matrix understanding an interdependencies of the routing pathways within the interconnect network 318 to complete the relevant initiator agent set for a particular power domain.

Figure 4:
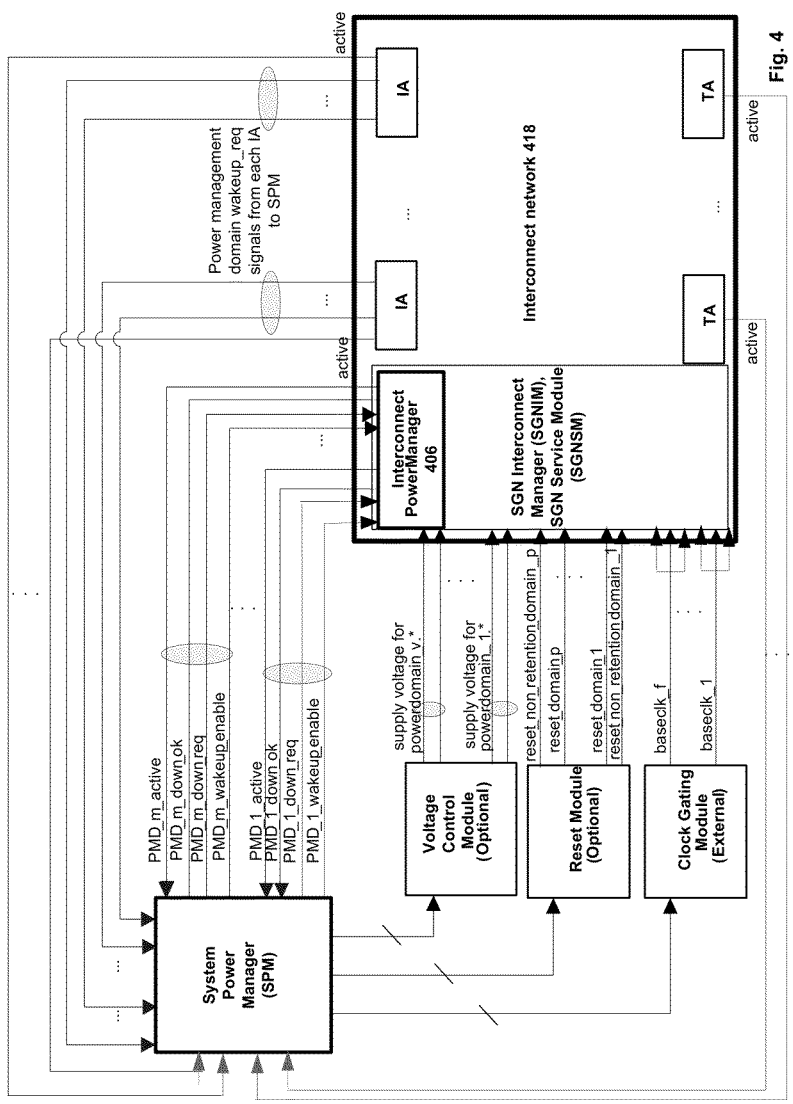
FIG. 4 illustrates a block diagram of an embodiment of external interfaces and components interfacing with the interconnect-power-manager.

FIG. 4 illustrates a block diagram of an embodiment of external interfaces and components interfacing with the interconnect-power-manager.

The external power domain related signals may have two or more sets of interfaces and, thus for example, two bundles in the interconnect—one at the interconnect-power-manager and one at an agent. The interconnect-power-manager and the interface at an agent have logic to implement the functions of the following signals. The signals in the bundle at the interconnect-power-manager may include down_req, down_ok, wakeup_enable, and domain_active signals. The signal bundle at an agent may include a wakeup_req signal for each power management domain that is used by request transactions that are handled at this initiator agent. Additionally, there is a separate bundle with one output signal at an agent that indicates whether an agent is active (has any pending transactions) or not: an agent_active signal.

Accordingly, an example interconnect-power-manager 406 has a PM interface bundle with some required signals and some optional signals between itself and the integrated-circuit-system-power-manager to effectively control each power domain in the interconnect network 418. The required signals include a request-acknowledgment signal to control the quiescing and waking up of a particular power domain. The down_req_i signal when asserted, triggers the interconnect network 418 to quiesce all components belonging to the power domain. The down_req_i signal when de-asserted, triggers the interconnect network 418 to wake up all components belonging to the power domain. The wakeup_enable_i signal when asserted, the wakeup process is driven from the interconnect network 418. The wakeup_enable signal when asserted, enables the IPM 206 to assert a wakeup_request when appropriate. The optional signals are an input signal and an output signal. The input signal to the interconnect-power-manager when asserted, enables an initiator agent to generate a wakeup request to the integrated-circuit-system-power-manager when the logic in the initiator agent determines that it needs to use a component in that particular power domain and that domain is currently quiesced. The output signal from the interconnect-power-manager indicates the activity status in the power domain.

The PM interface located in initiator agent also has a bundle with some optional signals on wakeup signaling and activity status signaling: a) an output signal which when asserted indicates that a new transaction arriving at an initiator agent needs to use the quiesced power domain. The wakeup_req_o signal indicates that an incoming transaction (at this initiator agent) needs to use a component belonging to the power domain.

The interconnect-power-manager 106 is configured to wake up a quiesced power domain upon an arrival of a new transaction needing to traverse the routing pathway in the interconnect network from the initiator agent to the final destination target agent that spans across one or more power domain in the quiesced power state. The interconnect-power-manager 106 in cooperation with a configuration register provides two or more mechanisms selectable by a designer at run time to wake up any of the quiesced power domains that the transaction needs to complete the routing pathway from the initiator agent to the final target agent destination. The two or more mechanisms include 1) the quiesced power domains can be either awakened "all at once" with the new transaction waiting at the initiator core socket/agent during the wakeup period or 2) each quiesced power domain can be awakened on demand as the new transaction progresses from the initiator agent to the final target agent destination through the interconnect network 418. The interconnect-power-manager 406 in cooperation with the configuration register allows more flexible partitioning of clock and power domains in later stages of the chip design than allowed with earlier technologies. As discussed, interconnect-power-manager 406 and the System Power Manager may cooperate to wake up any needed domains in parallel. Thus, the interconnect-power-manager 406 is configured to cooperate with the integrated-circuit-system-power-manager to wake up two or more quiesced power domains in parallel upon an arrival of the new transaction needing to traverse the routing pathway in the interconnect network from an initiator agent to a final destination target agent. Accordingly, the two or more power domains in the quiesced state that are in the routing path that the new transaction needs to complete the routing pathway from the initiator agent to the final target agent destination are configured to receive wake up signals at the same time from the integrated-circuit-system-power-manager based on a request coming from the IPM logic contained in the IA that received the new transaction. The logic in the initiator agent is configured to cause the new transaction to wait at the initiator core during a wakeup period of the two or more power domains.

The integrated-circuit-system-power-manager, in conjunction with three modules, manages clock gating (removal), power shut-off (PSO), and dynamic voltage and frequency scaling (DVFS).

The clock gating module is responsible for the source gating all interconnect network 418 clocks. The clock may not be removed (gated) until every power domain which is controlled by this clock has been quiesced/put to sleep; that is, until each of these power domains in the interconnect network' down_ok signals has been asserted. During wakeup of a power domain, it is not necessary for the associated clock to be enabled before the down_req can be de-asserted; of course, each power domain can only be awakened only after the clock has been enabled.

The voltage control module allows a power mode that requires a domain's power be scaled or shut off (PSO) and restored. The voltage is removed as a power domain is quiesced; that is a voltage is not completely turn off, until each of these power domains in the interconnect network' down_ok signals has been asserted. Each power domain can only be awakened; that is, down_req can be de-asserted, only after the voltage for that power domain has been enabled. A configuration register associated with the interconnect-power-manager 106 determines the conditions for turning on the power and turning it off. The Voltage Control Module switches on or switches off or scales the voltage independently to each power domain. This module is controlled by the integrated-circuit-system-power-manager.

The reset module allows a power mode that requires a domain's power be scaled or shut off (PSO) and restored. Each time after a power domain's voltage is removed and later restored, the power domain must be reset before its components can be used for regular transfers. The Reset Module resets a power domain after a power mode change. This module is controlled by the integrated-circuit-system-power-manager.

Table 1 lists example power management signals both internal and external and the related parameters.

TABLE 1

Power Management Related Signals and Parameters

| Name | Comments |
| --- | --- |
| Down_req_i | When asserted, triggers the interconnect network to quiesce all components belonging to the power domain. When de-asserted, triggers the interconnect network to wake up all components belonging to the power domain. |

TABLE 1-continued

Power Management Related Signals and Parameters

| Name | Comments |
| --- | --- |
| Down_ok_o | Response handshake corresponding to down_req_i. |
| wakeup_enable_i | When asserted, the interconnect network is authorized to assert wakeup_req_o as needed. When de-asserted, wakeup_req_o is held un-asserted. |
| wakeup_req_o | Signal is asserted when:<br>a) wakeup_enable_i is asserted<br>b) power domain is quiesced<br>c) An incoming transaction (at this initiator agent) needs to use a component belonging to the power domain.<br>Signal is de-asserted when any of the above conditionsi sno longer met. |
| domain_active_o | power domain indicates if it is active; that is, handling a transaction or transactions during this cycle or not. |
| agent_active_o | agent indicates if it is active; that is, handling a transaction or transactions during this cycle or not. |

There are two primary usage models based on the setting of the autowakeup_enable parameter. In addition, the interconnect network 418 provides an externally visible mechanism to monitor the activity status of each power domain through the domain_active_enable parameter and the activity status of each agent using the agent_active_enable parameter. The integrated-circuit-system-power-manager can use this mechanism to effectively provide an additional variant for each of the two usage models.

The integrated-circuit-system-power-manager through its cooperation with the interconnect-power-manager 406 controls the overall power management of each domain in the interconnect network 418. They prepare a power domain power domain_k signal in the interconnect network 418 for quiescing or waking up through the assertion or deassertion of the down_req signal.

Each initiator agent has logic configured to when the autowakeup_enable parameter is disabled, the interconnect network 418 may behave as a pure slave. If a domain is quiesced then incoming requests, which need to use a component in this domain, are either blocked or errored out at the core socket interface—the transaction is blocked if the associated initiator agent belongs to the power domain that is quiesced; else the transaction is errored out otherwise.

Each initiator agent has logic configured, to when the autowakeup_enable parameter is enabled and the wakeup_enable signal is asserted, then the interconnect network 418 provides feedback to the integrated-circuit-system-power-manager through the wakeup_req signal or signals requesting a quiesced domain be awakened when an incoming request needs to use a component in this domain. The logic for the wakeup_req signal internally monitors every initiator core socket cycle and transmits to the integrated-circuit-system-power-manager. It is the responsibility of the integrated-circuit-system-power-manager to use the appropriate low pass filter mechanism to interpret this cycle-by-cycle activity and use the PM signals to quiesce or wakeup a power domain. The expectation with this usage model is that waking up a power domain within the interconnect network takes only a few cycles—otherwise, transactions are subject to timeouts.

Additionally, the activity of each power domain can be monitored by the logic sending out the domain_active signal (see FIG. 4). This signal indicates if any transaction(s) in that power domain are active in that cycle. It is the responsibility of the integrated-circuit-system-power-manager to use the appropriate low pass filter mechanism to interpret this cycleby-cycle activity status and use this information to quiesce a power domain or to continue to keep it awakened.

When the agent_active_enable parameter is enabled for an agent, activity can also be monitored at a finer level at that agent. This enables the integrated-circuit-system-power-manager to handle power management in sophisticated scenarios, for example, when Interconnect network 418 instances are cascaded.

Figure 5:
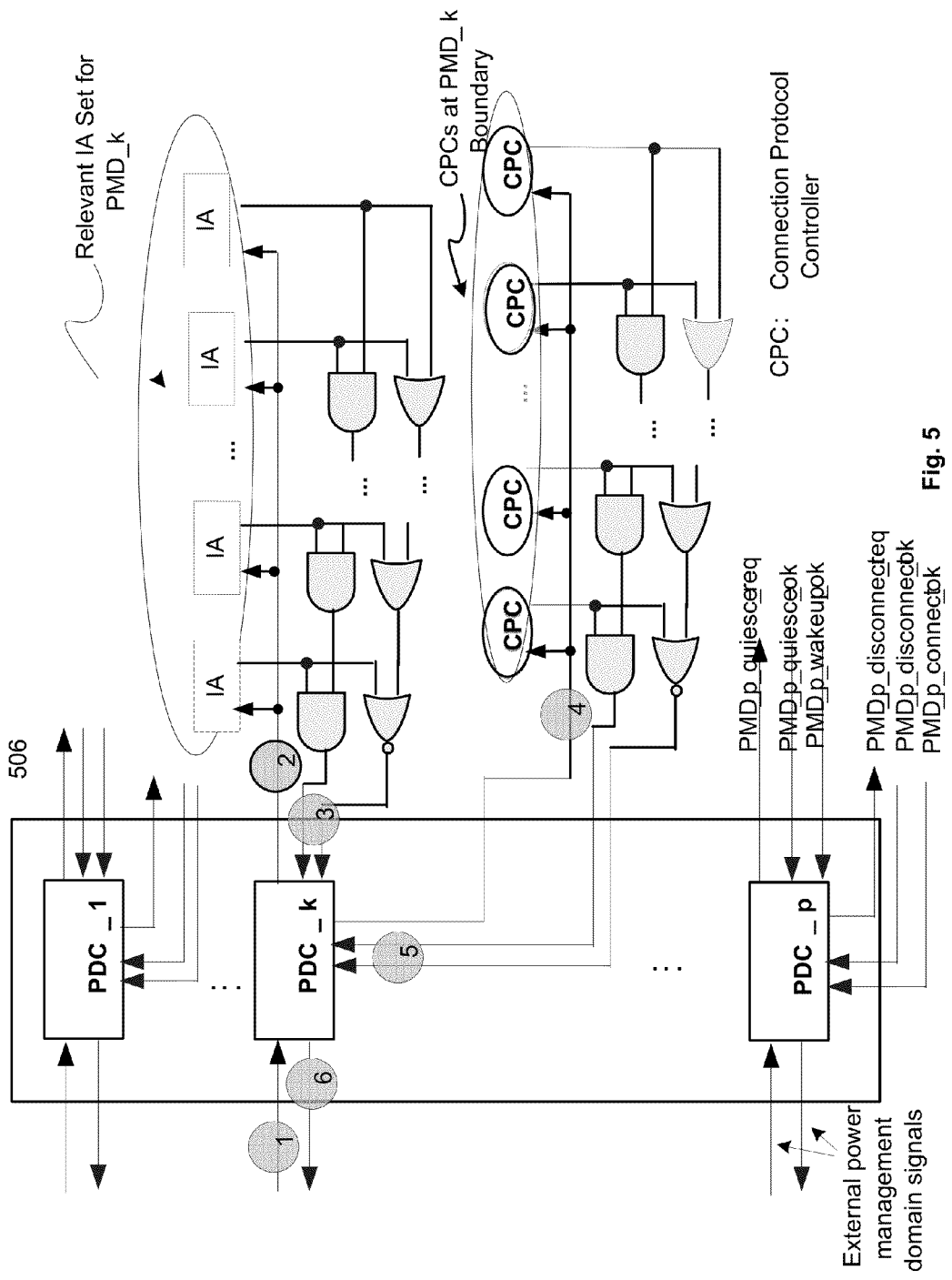
FIG. 5 illustrates a block diagram of an embodiment of the interconnect-power-manager that includes hardware circuitry integrated with the interconnect network.

FIG. 5 illustrates a block diagram of an embodiment of the interconnect-power-manager that includes hardware circuitry integrated with the interconnect network.

The interconnect power manager 506 is made of all or just a portion out of hardware circuitry and signaling ports. The interconnect-power-manager 506 may have a) two or more power domain controllers, one power domain controller for each power domain, an external interface with the integrated-circuit-system-power-manager and logic to support the external interface, and an internal interface for each power domain as well as b) the appropriate logic to send or broadcast requests, gather responses—this is considered to be part of the interconnect-power-manager even though the logic may be distributed. Thus, the interconnect-power-manager 506 includes hardware circuitry integrated with the interconnect network that is configured to quiesce and wakeup power domains within the interconnect network by communicating with hardware in the multiple domains within the interconnect network.

Each power domain controller for given power domain, such as power domain_k. Each power domain controller is a logic unit within the interconnect-power-manager which controls the quiescing and waking up of the components of interconnect such as agents, routers, etc., belonging to that power domain within the interconnect network. Each power domain, say power domain_k, has an associated power domain controller, PDC_k, which has multiple interfaces including a Quiesce/Wakeup interface, an External interface, and a Disconnect/Connect interface.

The External interface has logic and ports that are configured to perform the functions of the signals from the external integrated-circuit-system-power-manager which are shown in Table 1 and in FIGS. 4 & 5.

The Quiesce/Wakeup interface has logic and ports that are configured to cause signals that are used to quiesce or wakeup the relevant initiators for this power domain (the relevant initiator set is defined above). The signals (quiesce_req, quiesce_ok, and wakeup_ok) are shown in Table 1 and in FIGS. 4 & 5. The two responses separately identify when all the initiator agents have achieved the desired level of quiescence and when all the initiator agents are awakened.

The Disconnect/Connect interface has logic and ports that are configured to cause signals that are used to enforce the interconnects Connection Protocol at the link interfaces where the power domain boundary intersects. The signals (disconnect_req, disconnect_ok, and connect_ok) are shown in FIGS. 4 & 5. The two responses separately identify when all the CPCs have achieved the disconnection of the relevant links and when all the CPCs are ready to transfer requests.

Note: The circled numbers in FIG. 5 refer to the steps of the power management flows discussed below.

Quiescence/Wakeup Flows for Power Domain (Power Domain k)

The quiescence and wakeup requests are controlled by the external input signal down_req. The logic in the interconnect power manager responds by asserting (deasserting) down_req_ok after all the components in the domain have been quiesced (awakened). It is possible that the integrated-circuit-system-power-manager could deassert (assert) down_req before the quiescence (wakeup) is complete, i.e., before down_req_ok is asserted (de-asserted). In such a case, the logic in the interconnect-power-manager completes the quiescence or wakeup operation. A state machine in each power domain controller in the interconnect-power-manager, where each state machine is configured to ensure that the quiescence flow begins only when all components in the power domain associated with that power domain controller are awake as indicated by status registers and a wakeup flow begins only when all components in the domain are quiesced as indicated by the status registers.

Quiescence

The following steps may be performed in sequence to quiesce. Steps 4 and 5 are optional:

1. The logic and port in the interconnect-power-manager 506 receives a request from the integrated-circuit-system-power-manager. The request for power domain_k to be quiesced is received at the interconnect-power-manager with the assertion of the down_req signal which is sampled at the rising edge of the next clock. The signal remains asserted until the domain is to be awakened. This signal is an input signal on the external interface of the interconnect-power-manager.

2. The logic in the interconnect-power-manager 506 sends out a quiescence request internally. If power domain_k is awake (signaled by the assertion of wakeup_ok) the power domain controller, PDC_k, in the interconnect-power-manager asserts quiesce_req which is distributed to each of the initiator agents in the relevant initiator agent set for power domain_k on the next local clock cycle. Otherwise the quiesce_req signal retains its previous value. Please see FIG. 6.

The relevant initiator agent set for power domain_k is identified and stored in a register or table as part of the system derivation. Note the signal at the input to each initiator agent in this set may need to be power isolated and possibly level shifted before entering the power domain of that initiator agent. The initiator agent QUIESCE_REQ_STATUS for each initiator agent can be updated.

3. Based on the updated status of the QUIESCE_REQ_STATUS register, the initiator agent achieves the expected level of quiescence (i.e., if the initiator agent belongs to power domain_k then it quiesces itself completely; otherwise, it quiesces with respect to one or more target agents and updates the initiator agent QUIESCE_RESP_STATUS. The signal from each initiator agent in the relevant initiator agent set for power domain_k is logically ANDed to yield the quiesce_ok signal which is the input signal to the Quiesce/Wakeup interface on PDC_k. The signal being driven high indicates that all the initiator agents have reached quiescence from this power domain_k's perspective. Note that there is some subtlety in generating the signal from each initiator agent since the response status register indicates quiescence for a composite event while the quiescence signal has to be generated with respect to power domain_k.

4. Optionally, a request disconnection of links at each power domain boundary occurs. PDC_k sends a request disconnect_req to each link in the interconnect network (such as a PL or socket interface), one end of which is in power domain_k. This set of links is in the request and response networks of both the data flow and the control networks. The links are identified as part of the system derivation. A PL may be an internal link on an interconnect component such as a router or a bridge component.

Instead of identifying the links, it is possible and preferable to identify the components forming the power domain_k boundary or cut. This is preferable because the disconnect_req and disconnect_ok signals need to be sent on a per component basis. In such a case, the internal disconnect signals that are generated with in a component can be either a master initiated disconnect or a slave initiated disconnect. In such cases, the identification has to be at the link level and not at the component level.

5. Optionally, a disconnect complete occurs. The PDC does disconnection on the power domain's ports as follows. The signal from each link (or component) of the connection protocol controller is logically ANDed to yield the disconnect_ok signal which is the input signal to the Disconnect/Connect interface on PDC_k. With the present design of the quiescent flows, note that there should be no traffic on any link at power domain_k's boundary (and, of course, no traffic on any link in power domain_k). Hence this step, and the signaling associated with it, is extraneous.

The logic in the interconnect-power-manager waits for all of the components in the power domain, such as agents, routers, etc., to get quiesced.

6. The power domain controller, PDC_k, sends a response to the integrated-circuit-system-power-manager indicating that power domain_k is quiesced by asserting down_ok; and down_req is asserted (this is the normal case); if down_req is de-asserted then down_ok retains its previous value.

Note: target agents that belong to the same domain as the initiator agent being quiesced need not be checked for quiescence, since the initiator agent draining and fencing assures the quiescing of the TAs anyway. There is an advantage to exploit this fact, if target agent quiescence is achieved by the use of flush messages.

State Machine in PDC for Quiesce_Req Signal Generation.

The following steps are performed in sequence for the Wakeup Flow for a power domain (power domain_k):

1. The state machine in the power domain controller receives a request from integrated-circuit-system-power-manager. The request for power domain_k to be awakened is received at the interconnect-power-manager with the deassertion of the down_req signal that is sampled at the rising edge of the next clock. The signal remains de-asserted until the domain is to be quiesced again. This signal is an input signal on the external interface of the interconnect-power-manager.

2. The state machine in the power domain controller sends out a wakeup request internally. If power domain_k is quiesced (signaled by the assertion of quiesce_ok) the power domain controller, PDC_k, in the interconnect-power-manager deasserts quiesce_req (which is distributed to each of the initiator agents in the Relevant initiator agent Set for power domain_k on the next local clock cycle). Otherwise the quiesce_req signal retains its previous value. Please see FIG. 6.

3. The state machine in the power domain controller waits for a wake up. This step is a simple one since there is nothing particular for an initiator agent to do except to reset the STATUS bit in the RESPONSE register. There is one subtle issue here, however. It is best illustrated through an example. Consider initiator agent_1 in power domain_1 communicates with TA2 in power domain_2 through a router R in power domain_3. Assume power domain_2 and power domain_3 are both quiesced initially. Power domain_2 is to be awakened. A wake up signal (quiesce_req de-asserted) is sent to initiator agent_1. The initiator agent QUIESCE_RESP_STATUS TA2 continues to be set since power domain_3 is still down. Hence this output cannot be used to drive the quiesce_ok signal. This is the reason why the output from the response register status is logically ANDed with the registered quiesce_req signal to generate the agent's quiesce_ok signal which is logically ANDed together to generate the domain's quiesce_ok signal. This ensures that the domain quiesce_ok signal is de-asserted. Additionally, each of agent's quiesce_ok signal is logically NORed to generate an additional signal wakeup_ok signal.

4. Optionally, the state machine in the power domain controller requests a connection of links at power domain boundary. The PDC_k sends a connect request by deasserting the disconnect_req to each link in SGN (PL or socket interface), one end of which is in power domain_k. This set of links is in the request and response networks of both the data flow and the control networks. The links are identified as part of the system derivation.

5. The signal from each link (or component) is logically ANDed to yield the disconnect_ok signal which is the input signal to the Disconnect/Connect interface on PDC_k. Additionally, each of agent's disconnect_ok signal is logically NORed to generate an additional signal connect_ok signal. This step is optional but it is a good design practice to base flows, such as being described here, on "handshake based" signaling, especially in the presence of multiple clock/frequency domains in a power domain.

6. The state machine in the power domain controller, PDC_k, sends a response to the integrated-circuit-system-power-manager indicating that power domain_k may be awakened by deasserting down_ok if the down_req is de-asserted (this is the normal case); if down_req is asserted then down_ok retains its previous value.

The initiator agent has logic to track/monitor outstanding/retired status of each transaction received by that initiator agent. The interconnect-power-manager has several options configured for power management flows to quiesce target agents. A target agent is quiesced by a) ensuring that all outstanding transactions to it from an initiator agent are returned and b) by an initiator agent not generating new transactions to the target agent, once the quiesce request is received at the initiator agent. Hence, a clean target agent quiescence can be ensured by regulating just the initiator agents connected to that target agent. Options A) and B) described below follow this overall method while option C) explicitly quiesces the target agent.

The interconnect network also deals also with a mapping of threads/VCs to virtual channels, and thus possibly multiple virtual routes between a source and destination. Note that the route is defined by an output port id and the virtual channel id at each hop.

Option A to Quiesce Target Agents

Once an initiator agent, say initiator agent_1, sees the request for quiescence of a target agent, say TA1, (the corresponding bit in the Initiator_Agent Quiesce_Req_Status is set), then it generates a flush control packet for each virtual route from initiator agent_1 to TA1—this it does by walking through the route table entries. Note that multiple threads/tags/transaction ids may be mapped to the same virtual path—the number of flush messages depends upon the number of virtual paths, not on the number of threads/tags/transaction ids. Each route entry table has a bit associated with it indicating if the path is active or inactive (i.e., flushed). When the flush message returns, this bit is set to inactive. When all the route table entries for that target agent are inactive, then the target agent inactive signal is sent out from the initiator agent to the relevant power domain controller.

Since a target agent will be the recipient of many such messages from different initiator agents, it is worthwhile to consider if the target agent can generate only one flush response per initiator agent, even though an initiator agent may have multiple virtual paths to the target agent. The following variation to Option A allows this: Let there be k virtual routes from initiator agent_1 to TA1. Then initiator agent_1 generates k flush(k) packets to TA1—this is similar to the above case, except that the control packet has an additional parameter, k. The target agent uses this parameter to wait for k flush(k) control packets before generating a flush response to initiator agent_1. When initiator agent_1 receives the response, then it can immediately send a signal to the relevant power domain controller that TA1's quiescence with respect to initiator agent_1 has been achieved. This option A to quiesce target agents provides a) a clean way of handling with a flush as well as b) a scheme without needing to count the actual number of messages that quiescing target agent needs to handle.

Option B to Quiesce Target Agents

In this option, instead of a flush, a count is always maintained at an initiator agent of the number of outstanding transactions to each target agent that is awake. A variant of this option is to keep count of only the posted writes since other transactions have a completion response.

The method could use a counter to increment and decrement outstanding transaction count for that target agent. Keeping a counter for each target agent is wasteful since there can be at most one transaction is sent from and one returned to an initiator agent on a clock cycle. A simple optimization uses one register to track the number of transactions for each target agent but uses only one counter.

When a transaction returns from a target agent at an initiator agent, this count is decremented for that target agent. Note that on the same cycle, there can be there can a transaction sent and one returned in which case the count does not change.

Option C to Quiesce Target Agents

Here the target is responsible for its own quiescence. When a quiesce request is received, then the target, say TA1, sends a quiesce request to all initiator agents it is connected to. This is done by the target agent generating a control packet. The initiator agent responds to the quiesce request by generating responses along all virtual routes to TA1. The response from an initiator agent has to carry the number of responses it sends so that the target agent knows how many responses it has to receive from each initiator agent it is connected to. Once it has received all the responses and it has no outstanding transactions, the target agent can declare it is quiescent.

The interconnect-power-manager 506 includes two or more power domain controllers and each power domain controller has a state machine configured to send a signal to logic in each initiator agent to ensure that the quiescence flow begins only when all outstanding transactions that are routed to or through components in the domain are retired.

Figure 6:
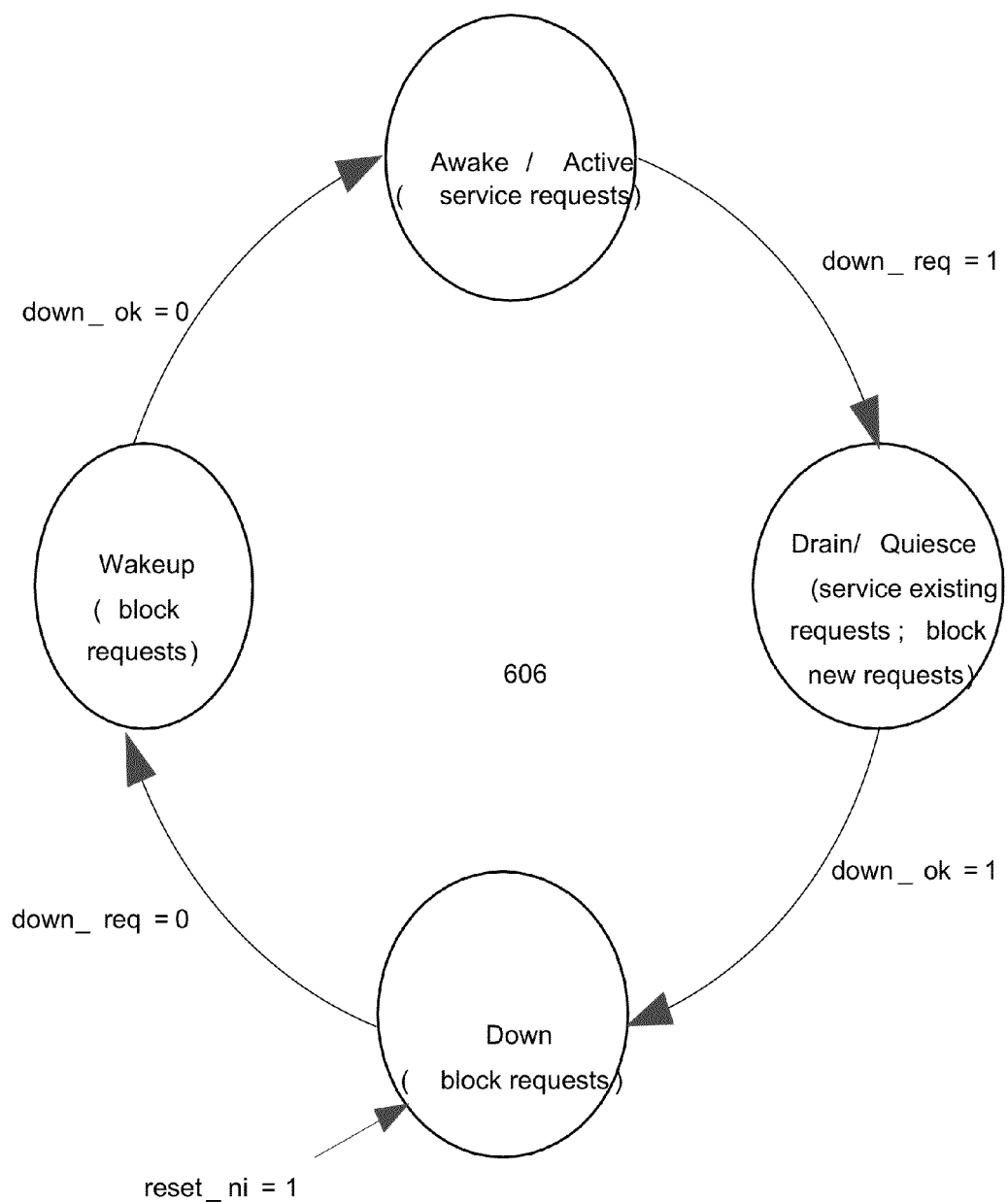
FIG. 6 illustrates a block diagram of an embodiment of a state machine in the interconnect-power-manager configured for power management of the power domain.

FIG. 6 illustrates a block diagram of an embodiment of a state machine in the interconnect-power-manager configured for power management of the power domain. The hardware circuitry in the interconnect-power-manager 606 includes multiple power domain controllers each with its own state machine to control a quiescing and waking up of the components within that power domain.

The state machine has quiesce and wakeup flows.

Figure 7:
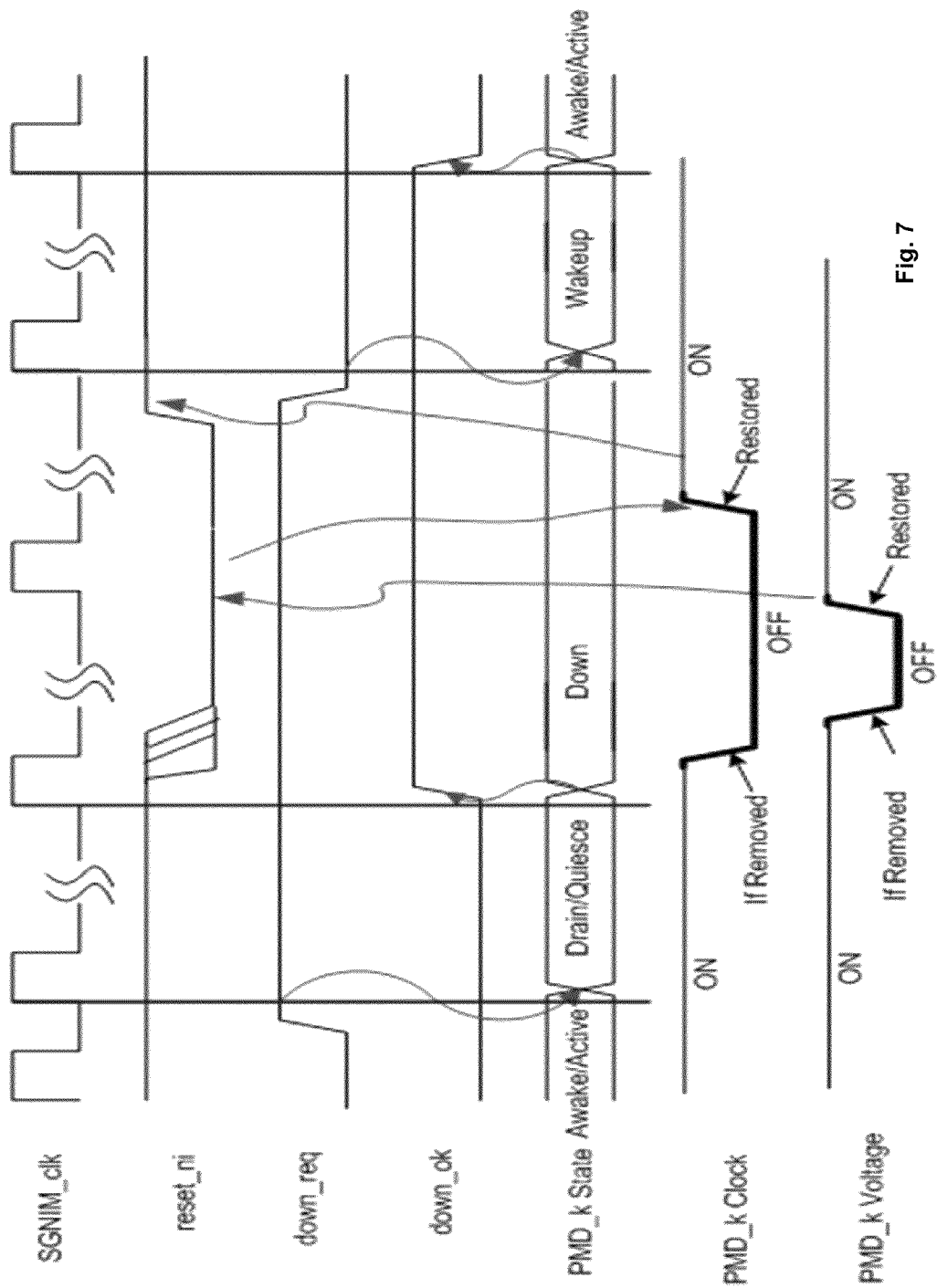
FIG. 7 illustrates a block diagram of an embodiment of a relative timing sequence for quiescing and waking up power domains by the state machine in the interconnect-power-manager.

The following operational steps for the state machine making up a power domain controller and its associated timing diagram is shown in FIG. 7.

1. Assume power domain_k is in the Awake or Active state. In this state, all requests which use or target components in power domain_k are serviced by the interconnect network. The down_req signal from the integrated-circuit-system-power-manager and the down_ok signal from the interconnect-power-manager are both de-asserted. The reset_ni, which controls power domain_k and possibly other Power domains in the interconnect network, signal is also de-asserted.

2. Upon the assertion of down_req signal from the integrated-circuit-system-power-manager, the state machine enters the Drain or Quiesce state. In this state, all outstanding requests that either use components (typically initiator agents, the interconnect routers) or target components (TAs) in power domain_k are completed. New requests at an initiator agent are either blocked or error terminated.

If the autowakeup_enable parameter is enabled and the wakeup_enable signal is asserted for this power domain and all the components in various power domains in the routing pathways through the interconnect network needed for this transaction to complete are either active or, if quiesced, can be awakened, then the initiator agent blocks the request (and all subsequent ones). It is expected that the integrated-circuit-system-power-manager will eventually wake up power domain_k and any other quiesced power domains in the interconnect network that are needed, thus unblocking this request.

If the autowakeup_enable parameter is disabled and if the initiator agent belongs to power domain_k then it blocks the request (and all subsequent ones).

Otherwise the initiator agent sends an error response to the request. The end of this step is detected when all the relevant initiator agents have fenced and drained transactions that use power domain_k.

3. The interconnect-power-manager asserts the down_ok signal and the state machine enters the down state. The interconnect network continues to block requests as outlined in Step 2 above. It is assumed that down_req signal continues to be asserted high as shown in timing FIG. 7. Even if down_req is de-asserted before down_ok is asserted, the behavior of the state machine does not change—on reaching the "Down" state, it is detected that down_req has been de-asserted—this causes a transition to the "Wakeup" state.

This completes the quiescing of power domain_k in a safe manner.

FIG. 7 illustrates a block diagram of an embodiment of a relative timing sequence for quiescing and waking up power domains by the state machine in the interconnect-power-manager. The system power manager can manage initiator sets and then interconnect power manager logic in each initiator agent manages interconnect network components that have connectivity to that initiator agent.

The following steps outline the sequence when power domain_k is to be awakened.

The voltage to power domain_k and other power domains in the routing path are restored if it was removed—see FIG. 7).

The reset module asserts reset_ni signal if the voltage had been removed and restored (see FIG. 7).

The clock to power domain_k is restored if it was removed (see FIG. 7).

The interconnect-power-manager state machine is in the Down state (with down_req and down_ok signals asserted).

The reset_ni signal is de-asserted, if it had been asserted.

1. Upon deassertion of down_req signal from the integrated-circuit-system-power-manager, the state machine enters the Wakeup state. The Interconnect network continues to block requests as outlined in Step 2 of the quiescence flow described above.

2. The interconnect-power-manager asserts the down_ok signal and the state machine enters the Awake/Active state. Outside of the interconnect network, the integrated-circuit-system-power-manager will indicate to the initiator cores that requests to power domain_k components in the interconnect network can begin. This step completes the cycle of events for waking up a power domain.

Retention of State in the Registers in the Interconnect Network

When power is removed from a power domain, say power domain_k, the state of software visible registers can be retained, making it unnecessary to re-program the configuration registers of interest when power is restored. This capability is enabled using the retention_flops parameter, which creates two separate hardware reset lines: reset_ni and reset_non_retention_ni.

The reset_ni signal resets all flip-flops in all components of the interconnect network in power domain_k and other power domains in the interconnect network controlled by this power domain controller at initial power-up of the chip.

The reset_non_retention_ni signal performs a reset after an operational power cycle, during which the integrated-circuit-system-power-manager puts all components of power domain_k in the interconnect network and other power domains in the interconnect network controlled by this power domain controller into sleep mode (Down state) and then wakes them up again.

Figure 8:
FIG. 8 illustrates an example connectivity matrix used in an embodiment of initiator agent that is configured by a designer to indicate all of the target IP cores this initiator agent connects to and its routing pathway.

FIG. 8 illustrates an example appropriate subset of a connectivity matrix used in an embodiment of initiator agent that is configured by a designer to indicate all of the target IP cores this initiator agent connects to and its routing pathway. The connectivity matrix 800 has an example configuration of three initiators and four targets that couple through agents to this interconnect network with the connectivity to each other as indicated in the connectivity matrix 800. For example, initiator agent a2 connects to target agents T1, T2, and T4 but not to target agent T3. Each initiator agent stores its appropriate subset of the connectivity matrix 800 to all of the targets this initiator connects to and its routing pathway as well as an address map.

Figure 9:
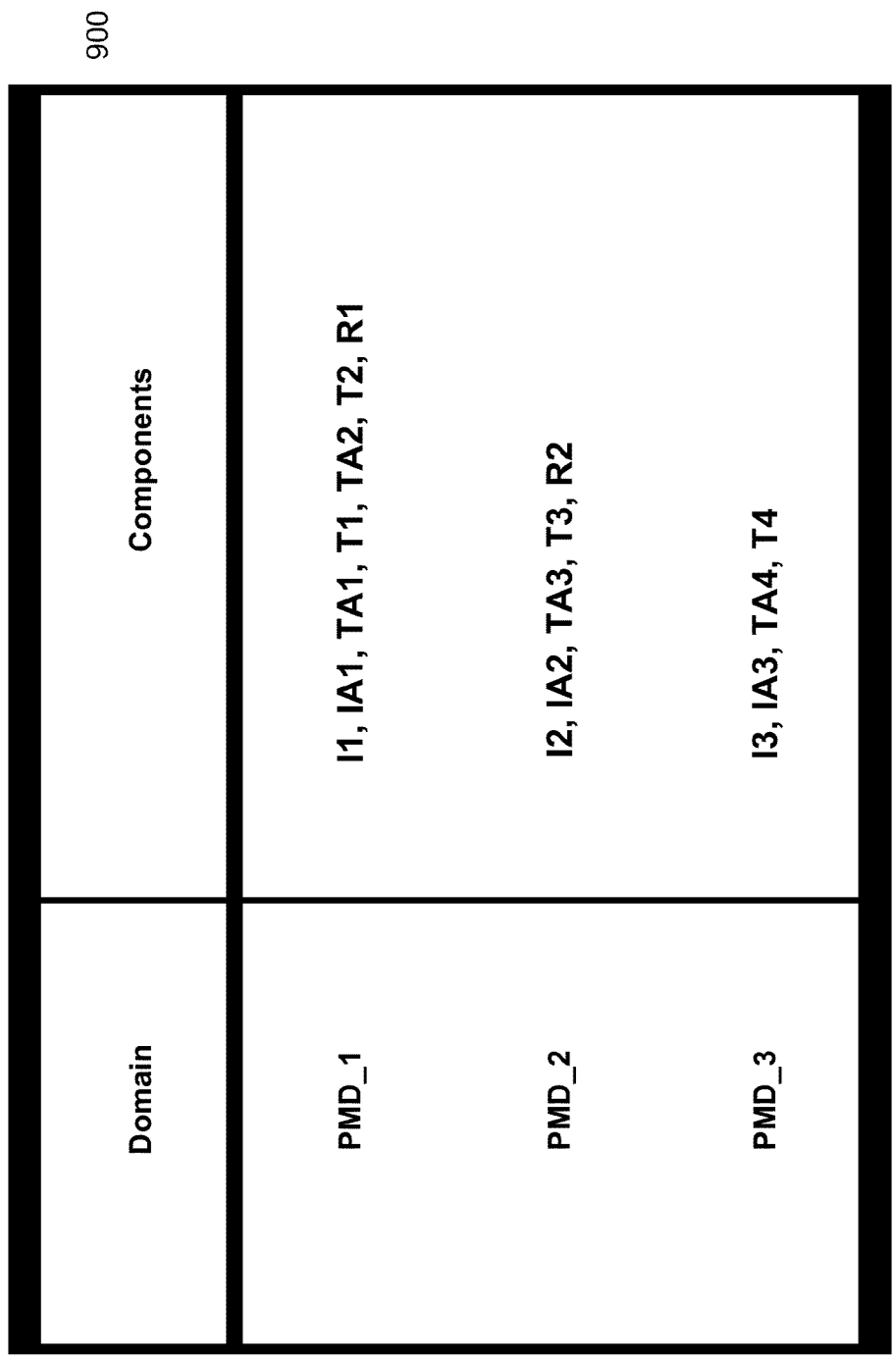
FIG. 9 illustrates an example table of an embodiment of power domains in the interconnect network that contain a designer identified and selected set of interconnect components, including any of routers, arbitration units, initiator agents, and target agents, which the designer identifies in a table that should be quiesced or awakened together in that power domain.

FIG. 9 illustrates an example table of an embodiment of power domains in the interconnect network that contain a designer identified and selected set of interconnect components, including any of routers, arbitration units, initiator agents, and target agents, which the designer identifies in a table that should be quiesced or awakened together in that power domain. Each power domain contains a designer identified set of interconnect components, routers/arbitration units, initiator agents/socket interfaces, and target agents, which naturally should be quiesced or awakened together in that power domain and are represented in a table 900 set by the designer of the system. The components represented in the table 900 can be set by the designer of the system at run time to in part to allow a more flexible partitioning of clock and power domains in later stages of the chip design than allowed with earlier technologies.

Figure 10:
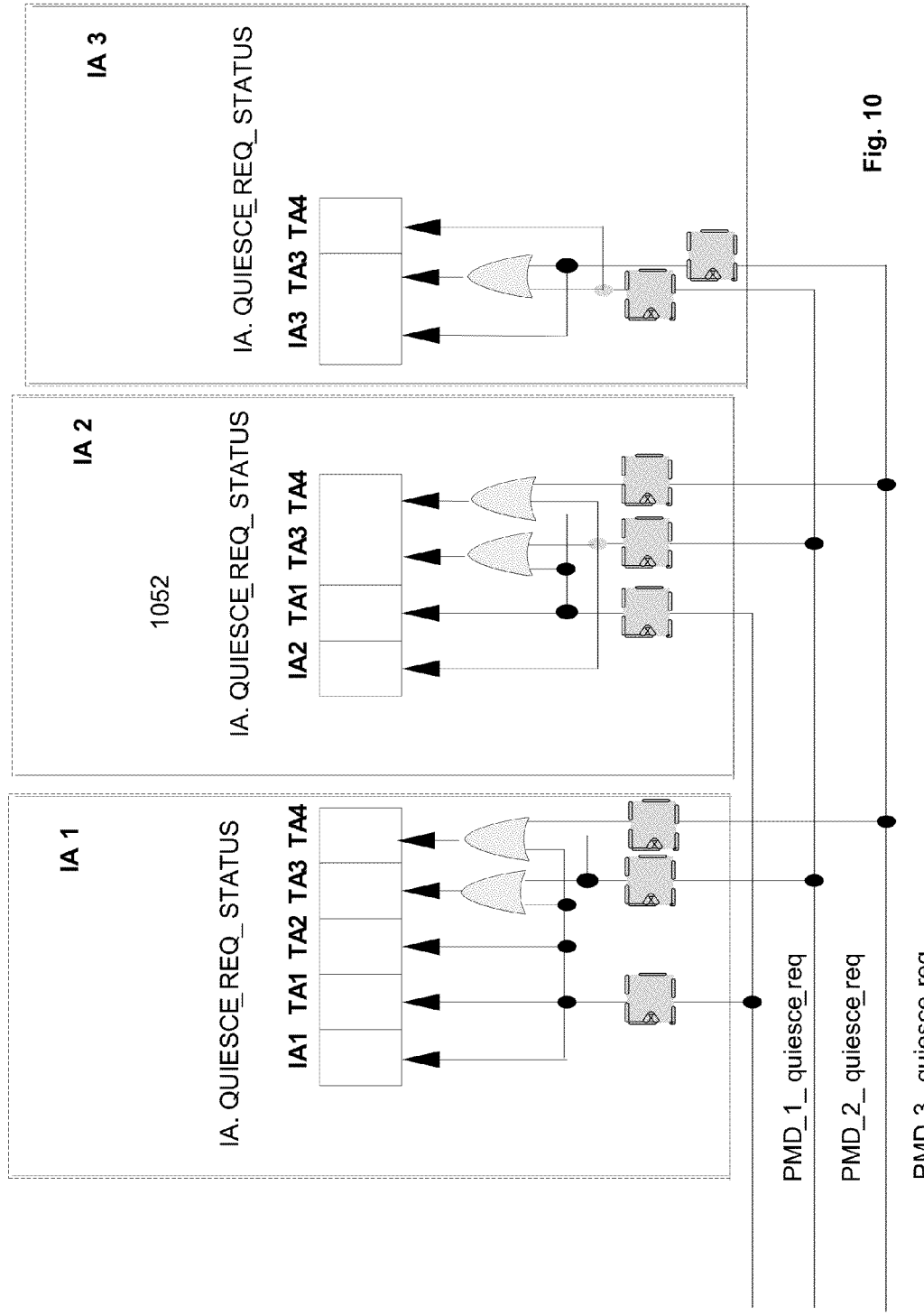
FIG. 10 illustrates a block diagram of an embodiment of a tracking mechanism to track a quiesce state for each power domain and logic located within each allow each initiator agent in a domain to know the power state of each component in that domain in order to know which components need to be requested to be awakened.

FIG. 10 illustrates a block diagram of an embodiment of a tracking mechanism to track a quiesce state for each power domain and logic located within each allow each initiator agent in a domain to know the power state of each component in that domain in order to know which components need to be requested to be awakened. The one or more status registers located with each initiator agent, such as the first set of status registers 1052 in IA2, indicate a quiesce power state of the target agents that have connectivity through routing pathways in the interconnect network with that initiator agent. In an alternative, the status registers in the agents may indicate a quiesced state defined on a per power domain basis rather than defined on a per target basis. In an alternative, the status registers in the agents may indicate a quiesced state defined on a routing path basis. In the presence of multiple routing paths between an initiator and a target that uses a different set of power domains along each routing path, the status registers could be defined on a per path basis—in such situations, the system designer has fine control since particular paths can be awakened or quiesced.

Each initiator agent in the interconnect network has a tracking mechanism to track a quiesce state for each external power domain that this agent has connectivity with through routing pathways in the interconnect network. Each initiator agent also contains logic to know the power state of each interconnect network component internal to the power domain containing that initiator agent in order to know which particular interconnect network components need to be requested to be awaken. The logic in the interconnect-power-manager updates the quiesce status registers in each initiator agent.

The power domain controller for a given domain updates the request status 1) to typically request the initiator agent to quiesce itself or 2) to quiesce with respect to particular target agents. After the initiator agents have achieved the desired level of quiescence, they indicate their status through a response status register. The combinational logic prior to the status registers is generated to account for all the power domains in the routing pathway from this initiator agent to that specific target agent. The combinational logic includes combinations of Boolean logic gates such as AND gates, OR gates, Inverters, Multiplexers, etc. and any combination of such.

Each initiator agent has a register named Initiator_Agent Quiesce_Req_Status which has the following characteristics:

The width of this register is the sum of both a) and b):

a) The number of target agents that this initiator agent communicates with. One or more storage bit locations are associated with a unique target agent.

b) An additional bit, Initiator_Agent Quiesce_Req_Status for the initiator agent.

The setting up of the Initiator_Agent Quiesce_Req_Status at each initiator agent and how it is updated for the example configuration is discussed below.

If Initiator_Agent Quiesce_Req_Status for the initiator agent=0 then it means that this initiator agent can initiate transactions. Thus, the power domain that this initiator agent belongs to is currently awake.

If Initiator_Agent Quiesce_Req_Status for the target agent_j=0 AND Initiator_Agent Quiesce_Req_Status for the initiator agent=0, then it means that this initiator agent can initiate transactions reliably to target agent_j. (Note, target agent_j applies to any one of the target agents 1-4 listed in the connectivity matrix.) Thus, a) target agent_j's power domain is awake, b) the power domains of all the routers in the request routing path in the interconnect network are awake, and c) the power domains of all the routers in the response routing path in the interconnect network are awake.

Alternatively, if Initiator_Agent Quiesce_Req_Status for the initiator agent=1, then it means that this initiator agent cannot initiate any data transactions because the power domain to which this initiator agent belongs is either quiesced or getting quiesced.

If Initiator_Agent Quiesce_Req_Status for the target agent_j=1, then it means that this initiator agent cannot initiate data transactions to target agent_j.

Thus, one or more power domains in the routing path is either quiesced, getting quiesced, or in the process of waking up.

The interconnect-power-manager sets the value of Initiator_Agent Quiesce_Req_Status for the initiator agent as follows: If quiesce_req for this power domain is asserted then Initiator_Agent Quiesce_Req_Status for the initiator agent=1; or Else, Initiator_Agent Quiesce_Req_Status for the initiator agent is set to 0.

The interconnect-power-manager sets the value of Initiator_Agent Quiesce_Req_Status for the target agent_j as follows: Let the power domains in the interconnect network that are crossed in traversing from this initiator agent to target agent_j (request path) and from target agent_j to this initiator agent, excluding the initiator agent's power domain, be power domain_1, power domain_2, . . . , power domain_p. If quiesce_req for any of these power domains in the interconnect network is asserted then Initiator_Agent Quiesce_Req_Status for the target agent_j is set to 1. Else, if the input quiesce signal for every power domain is de-asserted, then Initiator_Agent Quiesce_Req_Status for the target agent_j is set to 0.

Thus, each initiator agent may have status registers for one or more target agents in each power domain that the initiator agent connects to, and combinational logic that is used to represent the power domains that the routers belong to in the routing pathway between the initiator agent and the final target agent within the interconnect network to indicate a power mode state regarding each power domain this initiator agent has connectivity with. The combinational logic and status registers in cooperation with the interconnect-power-manager account for/track and control a quiescent state for all components in each power domain when the routing pathway in the interconnect network from the initiator agent to the final destination target agent spans across the one or more power domain boundaries within the interconnect.

Figure 11:
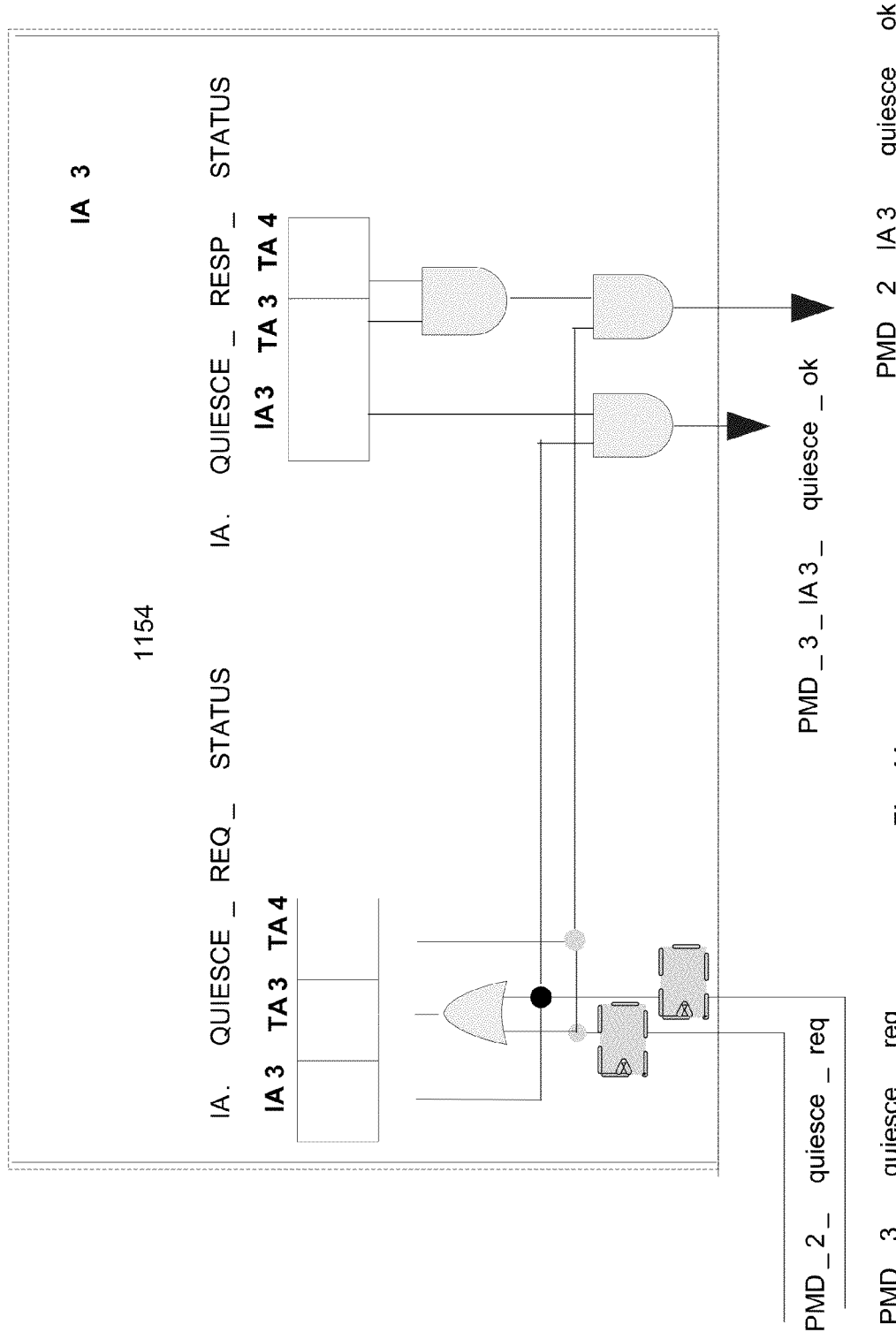
FIG. 11 illustrates a block diagram of an embodiment of an example initiator agent that has status registers for one or more target agents in a domain that the initiator agent connects to, and combinational logic that is used to represent the power domains that the routers belong to in the routing pathway between the initiator agent and the final target agent in the interconnect network, and the generation of an okay to quiesce signal response for each power domain.

FIG. 11 illustrates a block diagram of an embodiment of an example initiator agent that has status registers for one or more target agents in a domain that the initiator agent connects to, and combinational logic that is used to represent the power domains that the routers belong to in the routing pathway between the initiator agent and the final target agent in the interconnect network, and the generation of an okay to quiesce signal response for each power domain. Each initiator agent may have two or more sets of status registers 1154: Initiator_Agent Quiesce_Req_Status and Initiator_Agent Quiesce_RESP_Status.

Each initiator agent has a register named Initiator_Agent Quiesce_RESP_Status which has the following characteristics:

The width of this register is the sum of both a) and b):
  a) The number of target agents that this initiator agent communicates with. Each bit is associated with a unique target agent in an implementation dependent manner.
  b) An additional bit, Initiator_Agent Quiesce_RESP_Status for the initiator agent.

The status registers and combinational logic set up the generation of an okay to quiesce signal response for each power domain that has connectivity with this initiator agent. The logic and corresponding signals are incorporated into each initiator agent structure to interface with the integrated-circuit-system-power-manager and to achieve when 1) a power domain is to be quiesced, 2) outstanding transactions are to be drained, and 3) additional transactions which use components belonging to the power domain are to be fenced at the initiator core socket interface/initiator agent. Accordingly:

If Initiator_Agent Quiesce_RESP_Status for the initiator agent=1 then it means that this initiator agent is quiesced. If Initiator_Agent Quiesce_RESP_Status for the target agent_j=1, then it means that this initiator agent is quiesced with respect to target agent_j.

If Initiator_Agent Quiesce_RESP_Status for the initiator agent=0, then it means that this initiator agent is active.

If Initiator_Agent Quiesce_RESP_Status for the target agent_j=0, then it means that this initiator agent is active with respect to target agent_j.

The interconnect-power-manager sets the value of Initiator_Agent Quiesce_RESP_Status for the initiator agent as follows:

If Initiator_Agent Quiesce_Req_Status for the initiator agent=1 AND the socket interface is fenced and drained, then Initiator_Agent Quiesce_RESP_Status for the initiator agent is set to 1; else, Initiator_Agent Quiesce_RESP_Status for the initiator agent is set to 0.

When the logic fences this means no new transactions are accepted; and drained means all outstanding transactions are completed. Note, Read EX/WR and similar pairs are considered as single transaction for this purpose.

On the Arrival of a New Transaction at the Initiator Agent:

Let S={power management domain_1, . . . , power management domain_p} be the set of domains in the interconnect network that this transaction traverses (excluding this initiator agent's power management domain).

if Initiator_Agent Quiesce_Req_Status for the initiator agent=1 then block transaction;
  Note that the wakeup_req signal is deasserted when the associated power management domain is awake.

if the autowakeup parameter for this initiator agent's power management domain is enabled then the wakeup_req signal for the initiator agent is asserted;

if the autowakeup parameter for any power management domain in S is enabled and that domain is quiesced then the wakeup_req signal for that domain is asserted.

The initiator agent continues blocking this request (and succeeding ones) until it detects the reset of the Initiator_Agent Quiesce_Req_Status for the initiator agent bit by the power domain controller.

On the Arrival of a New Transaction at the Initiator Agent:

A description of the setting of the response status bit for target agent j follows. Assume Initiator_Agent Quiesce_RESP_Status for the initiator agent=0). Setting the value of Initiator_Agent Quiesce_RESP_Status for the target agent_j:

if Initiator_Agent Quiesce_Req_Status for the target agent_j=1 and there are no outstanding transactions issued to target agent_j (from this initiator agent) then Initiator_Agent Quiesce_RESP_Status for the target agent_j is set to 1; else, Initiator_Agent Quiesce_RESP_Status for the target agent_j is set to 0.

If Initiator_Agent Quiesce_Req_Status for the target agent_j is set to =1, then: if autowakeup parameter for this initiator agent's power domain is enabled and each power domain's wakeup_enabled_internal signal in S is asserted then transaction is blocked and the wakeup_req signal (for this power domain and initiator agent) is asserted; else, transaction is turned over in the initiator agent cross over queue with an error response.

The initiator agent continues blocking or error terminating a new transaction until it detects the reset of the Initiator_Agent Quiesce_Req_Status for the target agent_j bit by the power domain controller.

A transaction may be blocked or error terminated immediately after the status bit on the QUIESCE REQUEST register is set by the power domain controller. An alternative is to begin blocking or error terminating only after the status bit in the QUIESCE RESPONSE register is set. The earlier approach has two advantages: a) A flush operation can be effectively done to detect the draining of transactions, b) it could shorten the quiescing time of each power domain since a single initiator agent which has incoming transactions will not delay quiescence. In general, the integrated-circuit-system-power-manager will cooperate with the interconnect-power-manager to begin quiescing a power domain within the interconnect network (especially when the autowakeup parameter is not enabled) when they are sure that transactions through the routing paths of the interconnect network are not in flight.

The generation of the quiesce response signal is a little tricky since the bits in the QUIESCE request and response registers for the target agents represent the composite status based on all the power domain crossings in the interconnect network pathway from an initiator agent to a target agent. This generation of the quiesce response OK signal is illustrated for initiator agent3 in FIG. 11.

Domain Wakeup with Autowakeup Enabled

The interconnect-power-manager responds to an incoming request transaction which cannot establish a path through the multiple power domains within the interconnect network from the initiator core to the target core because one or more components in the path are quiesced. The interconnect-power-manager also responds to an incoming response transaction which cannot establish a path through the multiple power domains within the interconnect network from the target core to the initiator core because one or more components in the path are quiesced. In such a case, with the autowakeup_enable parameter disabled, the new transaction is either blocked at the core socket interface or errored out. On the other hand, with the autowakeup_enable parameter enabled and the wakeup_enable signal for the relevant power domains in the interconnect network asserted, such an incoming transaction attempts to wake up the intervening power domains in the interconnect network.

Referring to FIG. 2, in the interconnect network 218, the transaction is sent from the initiator agent 1) only after all the power domains in the path within the interconnect network are awake or 2) progressively through power domains waking them up as needed. Let us take an example: initiator agent_1 is connected to target agent4. Initiator agent_1 and its associated core are in domain power domain_1 (already awake). Target agent4 and its associated core are in power domain_3 which is quiesced. The routing path from initiator agent_1 to target agent4 has a router R2 which is in power domain_2, which is also quiesced. With the autowakeup_enable parameter enabled and the wakeup_enable signals for both power domain_2 and power domain_3 asserted, the transaction arriving at initiator agent_1 triggers the wakeup of power domain_2 and power domain_3. In this case, the logic in the initiator agent_1 determines the power domains in the interconnect network to be awakened (the quiesce status register and the surrounding combinational logic essentially have this information). Meanwhile, the transaction waits at initiator agent_1 (back pressuring the socket interface) making forward progress once it gets an indication, through the Initiator_Agent QUIESCE_STATUS register bit associated with target agent4 that power domain_2 and power domain_3 are awake. If the power domains in the interconnect network don't wake up in time (i.e., within the transaction time out period), the transaction is errored terminated. Otherwise, it is launched in a normal manner. This is a big advantage of this scheme. The main con of this scheme is that other transactions which could have made forward progress are back pressured (having a FIFO on the side for such transactions is a possible solution with additional logic to address ordering issues that arise).

As System on a Chip designers strive for lower power consumption, the number of clock and power domains continues to increase. These domains enable power reduction by switching off local supplies to eliminate leakage current, dynamically scaling voltages and clocks (especially in processing subsystems such as CPUs, GPUs and video engines) to optimize active power for operating conditions and altering IP core clocks to meet the needs of application usage scenarios. This increase in domains is also a function of the increase in the number of heterogeneous cores that are present in the SoC, which drives the need to provide Globally Asynchronous Locally Synchronous (GALS) networks that speed timing closure.

A properly architected network-on-chip needs to be able to deal natively with each of these domains, meaning flexible domain crossing choices, zero performance loss at a crossing, and importantly, allowing power-boundaries to be positioned anywhere within the network. Having the ability to partition the SoC into many fine-grained, separately controlled domains, enables the SoC designer to tune each IP core or subsystem to minimize energy consumption. That enables new levels of power control. Aggressive power management is, without a doubt, a key differentiator in this mobile device-crazed market.

The interconnect network that has multiple power domains provides a high speed routed network with a GHz network-on-chip, Scalable design, and efficient wire area. The interconnect network comes at a time when high-end chips are skirting the boundary from multi- to many-core devices, increasingly using a variety of processor types and blocks. The interconnect network addresses video, networking and mobile applications processors. The interconnect network boosts data rates up to a GHz and beyond. The technology, previously limited to chips with about 64 cores, the interconnect network will now handle devices with more than 200 IP cores coupled to agents of the interconnect network.

Previous technologies were limited by what could be achieved in switching and spanning distances in a single clock cycle, so it used crossbars and shared buses. The routing architecture of the interconnect network also enables support of up to eight virtual channels. In addition, the new network-on-chip allows more flexible partitioning of clock and power domains in later stages of the chip design than allowed with earlier technologies.

A methodology can be implemented to reduce the number of wakeup request signals that are sent to the System Power Manager (SPM) by using a simple combinational circuit which exists in a power domain that is "switched on" if any of the power domains in the interconnect are "switched on". This is an optional feature since this optimization is possible merely when such a power domain is available to the Interconnect Power Manager.

The wakeup_req output signal is an output from IAs going to the SPM. Potentially (depending on the connectivity), there can be c*m signals where c is the number of initiator cores/agents and m is the number of PMDs. In fact, with the assumption of an "always ON" power domain, the number of signals will be reduced to m. The simple logic (basically an OR gate is used) to achieve this reduction in wires is placed in a separate level of the RTL hierarchy.

In an embodiment, the IPM may be a unitary block of logic, storage and ports. In an embodiment, the IPM may be a unitary block of logic, storage and ports along with logic distributed throughout each IA in the interconnect network (or similar implementation). In an embodiment, the IPM manages transaction activity for interconnect network components in a power domain and the SPM controls power for all components in a PD. In an embodiment, the IPM controls power for all interconnect network components in a PD.

Referring back to FIG. 1, the Intellectual Property cores (IP) have self-contained designed functionality to provide that macro function to the system. For example, initiator property cores Central processing unit 102, has all the logic and software configured to provide that macro function to the integrated circuit. In some embodiments, the initiator IP core may be implemented in the integrated circuit. In other embodiments, the initiator IP core might be implemented external to the System-on-a-Chip but connect to the interconnect. The target IP core can include a memory and be coupled to the initiator IP core. For example the initiator IP core and the target IP core may comprise a processor coupled to the memory. The memory may store instructions and data for the processor, which can read the data and instructions and execute the instructions to perform various functions.

The mobile computing device containing the integrated circuit may include the power mode of state of the interconnect network 118 in which each power domain operates in a specific nominal condition. The power mode and the transition from one mode to another is determined by the integrated-circuit-system-power-manager but is managed in cooperation with the interconnect-power-manager 106.

The interconnect 118 may implement an address map with assigned address for the target IP cores 120-128, and potentially the initiator IP cores 102-114 in the system to route the requests, and potentially responses between the target IP cores 120-128 and initiator IP cores 102-114 in the integrated circuit. Most of the distinct IP cores communicate to each other over the interconnect 118 as well as through the memory IP cores 120-126, on and off chip.

The address mapping hardware circuitry may be located inside an initiator agent. One method for determining the routing of requests from initiators to targets is to implement an address mapping apparatus that associates incoming initiator addresses with specific target IP cores.

The interconnect 118 provides a shared communications bus between IP core sub-systems 120-128 and 102-114 of the system. All the communication paths in the shared communication bus need not pass through a single choke point, rather many distributed pathways may exist in the shared communication bus. The on-chip interconnect 118 may be a collection of mechanisms that may be adapters and/or other logical modules along with interconnecting wires that facilitate address-mapped and arbitrated communication between the multiple Intellectual Property cores 102-106 and 108-120.

The interconnect 118 may be part of an integrated circuit, such as System-on-a-Chip, that is pipelined with buffering to store and move requests and responses in stages through the System-on-a-Chip. The interconnect 118 may be part of an integrated circuit, such as System-on-a-Chip, that is pipelined with buffering to store and move requests and responses in stages through the System-on-a-Chip. The interconnect 118 may have flow control logic that 1) is non-blocking with respect to requests from another thread, as well as with respect to requiring a response to an initial request before issuing a subsequent request from the same thread, 2) implements a pipelined protocol, and 3) maintains each thread's expected execution order.

A target core, such as an OCP slave, should normally return responses to request transactions made by the initiator core, such as an OCP master, in the same order in which the requests were issued by the OCP master. However, sometimes it makes more sense for the OCP slave to return serviced responses out of their expected order to the OCP master and let logic in the interconnect to handle the ordering of the transaction. Tag identification numbers can be used to directly link the response with the original thread generating the transaction request that triggered the response from the OCP slave. In many cases, the use of tag logic within the interconnect, such as located in an agent, assigns tags to improve overall system performance by allowing multiple transactions from the same thread of a multiple threaded initiator to be outstanding over the interconnect to two or more different targets at the same time.

An initiator IP core may generate a thread of related transactions. The tag logic allows the transactions to be tagged, and, on the basis of that tag, to be treated differently. This allows for data flows from different initiator IP cores/masters or even different threads from the same initiator to be identified by target/slave cores, facilitates differential quality of service to distinct data streams and often improves performance by allowing transfer reordering to suit subsystem timing constraints (e.g. in DRAM controllers).

Some embodiments of the systems, methods, and apparatus described herein may include a machine-readable storage medium that stores instructions. These instructions might, when executed by a machine, causes the machine to generate model representations for an integrated circuit which may be used in an Electronic Design Automation process.

Figure 12:
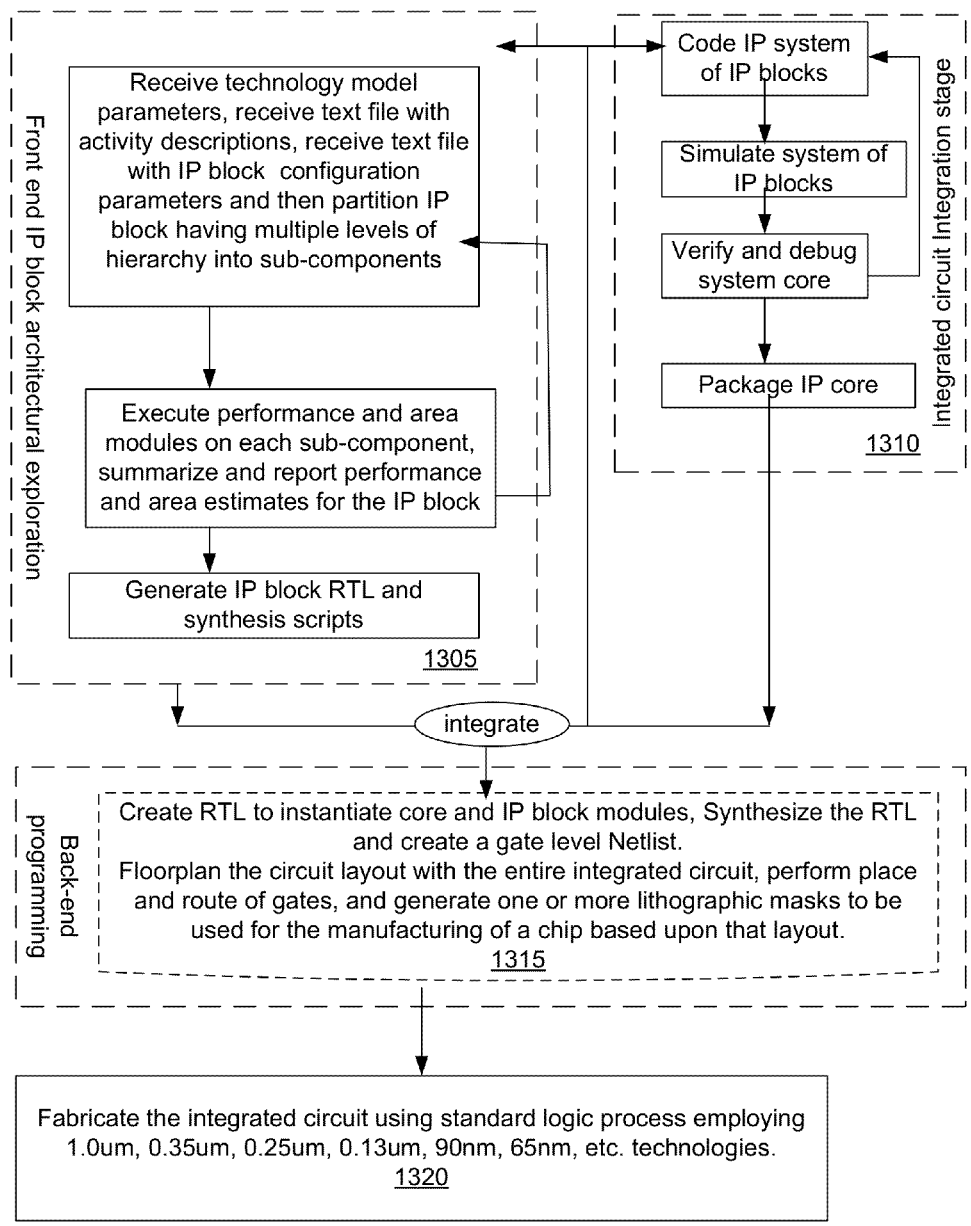
FIG. 12 illustrates a flow diagram of an embodiment of an example of a process for generating a device, such as a System-on-a-Chip, in accordance with the systems and methods described herein.

FIG. 12 illustrates a flow diagram of an embodiment of an example of a process for generating a device, such as a System-on-a-Chip, in accordance with the systems and methods described herein. The example process for generating a device with designs of the Interconnect and power manager may utilize an electronic circuit design generator, such as a System-on-a-Chip compiler, to form part of an Electronic Design Automation (EDA) toolset. Hardware circuitry, coded software, and a combination of both may be used to implement the following design process steps using an embodiment of the EDA toolset. The EDA toolset such may be a single tool or a compilation of two or more discrete tools. The information representing the apparatuses and/or methods for the circuitry in the Interconnect, Memory Scheduler, Power Manager, etc. may be contained in an Instance such as in a cell library, soft instructions in an electronic circuit design generator, or similar machine-readable storage medium storing this information. The information representing the apparatuses and/or methods stored on the machine-readable storage medium may be used in the process of creating the apparatuses, or model representations of the apparatuses such as simulations and lithographic masks, and/or methods described herein.

Aspects of the above design may be part of a software library containing a set of designs for components making up the scheduler and Interconnect and associated parts. The library cells are developed in accordance with industry standards. The library of files containing design elements may be a stand-alone program by itself as well as part of the EDA toolset.

The EDA toolset may be used for making a highly configurable, scalable System-On-a-Chip (SOC) inter block communication system that integrally manages input and output data, control, debug and test flows, as well as other functions. In an embodiment, an example EDA toolset may comprise the following: a graphic user interface; a common set of processing elements; and a library of files containing design elements such as circuits, control logic, and cell arrays that define the EDA tool set. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect and logic circuitry on a machine-readable storage medium.

Generally, the EDA toolset is used in two major stages of SOC design: front-end processing and back-end programming. The EDA toolset can include one or more of a RTL generator, logic synthesis scripts, a full verification testbench, and SystemC models.

Front-end processing includes the design and architecture stages, which includes design of the SOC schematic. The front-end processing may include connecting models, configuration of the design, simulating, testing, and tuning of the design during the architectural exploration. The design is typically simulated and tested. Front-end processing traditionally includes simulation of the circuits within the SOC and verification that they should work correctly. The tested and verified components then may be stored as part of a stand-alone library or part of the IP blocks on a chip. The front-end views support documentation, simulation, debugging, and testing.

In block 1305, the EDA tool set may receive a user-supplied text file having data describing configuration parameters and a design for at least part of a tag logic configured to concurrently perform per-thread and per-tag memory access scheduling within a thread and across multiple threads. The data may include one or more configuration parameters for that IP block. The IP block description may be an overall functionality of that IP block such as an Interconnect, memory scheduler, etc. The configuration parameters for the Interconnect IP block and scheduler may include parameters as described previously.

The EDA tool set receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

The EDA tool set may partition the IP block design by creating an abstract executable representation for each IP sub component making up the IP block design. The abstract executable representation models TAP characteristics for each IP sub component and mimics characteristics similar to those of the actual IP block design. A model may focus on one or more behavioral characteristics of that IP block. The EDA tool set executes models of parts or all of the IP block design. The EDA tool set summarizes and reports the results of the modeled behavioral characteristics of that IP block. The EDA tool set also may analyze an application's performance and allows the user to supply a new configuration of the IP block design or a functional description with new technology parameters. After the user is satisfied with the performance results of one of the iterations of the supplied configuration of the IP design parameters and the technology parameters run, the user may settle on the eventual IP core design with its associated technology parameters.

The EDA tool set integrates the results from the abstract executable representations with potentially additional information to generate the synthesis scripts for the IP block. The EDA tool set may supply the synthesis scripts to establish various performance and area goals for the IP block after the result of the overall performance and area estimates are presented to the user.

The EDA tool set may also generate an RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In block 1310, a separate design path in an ASIC or SOC chip design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly. The system designer codes the system of IP blocks to work together. The EDA tool set generates simulations of representations of the circuits described above that can be functionally tested, timing tested, debugged and validated. The EDA tool set simulates the system of IP block's behavior. The system designer verifies and debugs the system of IP blocks' behavior. The EDA tool set tool packages the IP core. A machine-readable storage medium may also store instructions for a test generation program to generate instructions for an external tester and the interconnect to run the test sequences for the tests described herein. One of ordinary skill in the art of electronic design automation knows that a design engineer creates and uses different representations, such as software coded models, to help generating tangible useful information and/or results. Many of these representations can be high-level (abstracted and with less details) or top-down views and can be used to help optimize an electronic design starting from the system level. In addition, a design process usually can be divided into phases and at the end of each phase, a tailor-made representation to the phase is usually generated as output and used as input by the next phase. Skilled engineers can make use of these representations and apply heuristic algorithms to improve the quality of the final results coming out of the final phase. These representations allow the electric design automation world to design circuits, test and verify circuits, derive lithographic mask from Netlists of circuit and other similar useful results.

In block 1315, next, system integration may occur in the integrated circuit design process. Back-end programming generally includes programming of the physical layout of the SOC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SOC containing the system of IP blocks. The system of IP blocks with the fixed RTL and synthesis scripts may be simulated and verified. Synthesizing of the design with Register Transfer Level (RTL) may occur. The logic synthesis tool synthesizes the RTL design to create a gate level Netlist circuit design (i.e. a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist can also describe the connectivity of an electronic design such as the components included in the design, the attributes of each component and the interconnectivity amongst the components. The EDA tool set facilitates floor planning of components including adding of constraints for component placement in the space available on the chip such as XY coordinates on the chip, and routes metal connections for those components. The EDA tool set provides the information for lithographic masks to be generated from this representation of the IP core to transfer the circuit design onto a chip during manufacture, or other similar useful derivations of the circuits described above. Accordingly, back-end programming may further include the physical verification of the layout to verify that it is physically manufacturable and the resulting SOC will not have any function-preventing physical defects.

In block 1320, a fabrication facility may fabricate one or more chips with the signal generation circuit utilizing the lithographic masks generated from the EDA tool set's circuit design and layout. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm, 45 nm, 28 nm or less, to fabricate the chips. The size of the CMOS logic process employed typically defines the smallest minimum lithographic dimension that can be fabricated on the chip using the lithographic masks, which in turn, determines minimum component size. According to one embodiment, light including X-rays and extreme ultraviolet radiation may pass through these lithographic masks onto the chip to transfer the circuit design and layout for the test circuit onto the chip itself.

The EDA toolset may have configuration dialog plug-ins for the graphical user interface. The EDA toolset may have an RTL generator plug-in for the SocComp. The EDA toolset may have a SystemC generator plug-in for the SocComp. The EDA toolset may perform unit-level verification on components that can be included in RTL simulation. The EDA toolset may have a test validation testbench generator. The EDA toolset may have a dis-assembler for virtual and hardware debug port trace files. The EDA toolset may be compliant with open core protocol standards. The EDA toolset may have Transactor models, Bundle protocol checkers, OCPDis2 to display socket activity, OCPPerf2 to analyze performance of a bundle, as well as other similar programs.

As discussed, an EDA tool set may be implemented in software as a set of data and instructions, such as an instance in a software library callable to other programs or an EDA tool set consisting of an executable program with the software cell library in one program, stored on a machine-readable medium. A machine-readable storage medium may include any mechanism that stores information in a form readable by a machine (e.g., a computer). For example, a machine-readable medium may include, but is not limited to: read only memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. The instructions and operations also may be practiced in distributed computing environments where the machine-readable media is stored on and/or executed by more than one computer system. In addition, the information transferred between computer systems may either be pulled or pushed across the communication media connecting the computer systems.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In an embodiment, the logic consists of electronic circuits that follow the rules of Boolean Logic, software that contain patterns of instructions, or any combination of both. Various components described above may be implemented in hardware circuitry, software, or any combination of both.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. Logic and registers in the initiator agent may also be located in a target agent. The invention is to be understood as not limited by the specific embodiments described herein, but only by scope of the appended claims.

The invention claimed is:
1. An apparatus, comprising:
an interconnect-power-manager that has hardware circuitry and signaling ports configured to cooperate and communicate with an integrated-circuit-system-power-manager as well as with different agents within an interconnect network for an integrated circuit, where the interconnect network is partitioned into multiple power domains, and the interconnect-power-manager has the hardware circuitry integrated into the interconnect network to manage a quiescent state for all components in each power domain in the interconnect network when a routing pathway for transactions in the interconnect network spans across one or more power domain boundaries and causes interdependencies of power domains within the interconnect network other than the locations of the power domains containing an initiator agent generating a new transaction and a final target agent of the new transaction, where one or more initiator cores each couple to their own corresponding initiator agent, and one or more target cores each couple to their own corresponding target agent, and those different agents have their power state managed by the integrated-circuit-system-power-manager, which is separate than the interconnect-power-manager managing the multiple power domains of the interconnect network, where the integrated-circuit-system-power-manager is configured to cooperate and communicate with the interconnect-power-manager 1) to quiesce, 2) to wake up, and 3) any combination of the two, one or more of the multiple power domains within the interconnect network, where each power domain is separately controllable from other power domains in the interconnect network by the interconnect-power-manager.

2. The apparatus of claim 1, where the interconnect network is used to communicate and route transactions between a plurality of initiator IP cores and a plurality of target IP cores in the integrated circuit, and the integrated-circuit-system-power-manager controls the multiple power domains of the interconnect network via its cooperation with the interconnect-power-manager as well those containing the initiator and target cores themselves, where the integrated-circuit-system-power-manager is external to the interconnect network, and where each power domain is separately controllable from other power domains in the interconnect network allows for flexible power management control by an external integrated-circuit-system-power-manager cooperating and interfacing with the interconnect-power-manager.

3. The apparatus of claim 1, where one or more initiator agents in the interconnect network each has its own status registers for one or more target agents in each power domain that the initiator agent connects to, and combinational logic that is used to represent the power domains that routers belong to in the routing pathway between the initiator agent and the final target agent within the interconnect network to indicate a power mode state regarding each power domain this initiator agent has connectivity with, and where the combinational logic and the status registers in cooperation with the interconnect-power-manager track and control the quiescent state for all the components in each power domain when the routing pathway in the interconnect network from the initiator agent to the final destination target agent spans across the one or more power domain boundaries within the interconnect.

4. The apparatus of claim 1, where the interconnect-power-manager is configured to wake up a quiesced power domain upon an arrival of the new transaction needing to traverse the routing pathway in the interconnect network from the initiator agent to the final destination target agent that spans across that power domain in the quiesced power state, where the interconnect-power-manager in cooperation with a configuration register provides two or more mechanisms selectable by a designer at run time to wake up any of the quiesced power domains that the transaction needs to complete the routing pathway from the initiator agent to the final target agent destination, and where the two or more mechanisms include 1) the quiesced power domains can be either awakened "all at once" with the new transaction waiting at the initiator core during a wakeup period or 2) each quiesced power domain can be awakened on demand as the new transaction progresses from the initiator agent to the final target agent destination through the interconnect network.

5. The apparatus of claim 1, where two or more power domains in the interconnect network contain a designer identified and selected set of interconnect components, including any of routers, arbitration units, initiator agents, and target agents, which the designer identifies in a table that should be quiesced or awakened together in that power domain and the components represented in the table can be set by the designer of the integrated circuit at run time to in part to allow a more flexible partitioning of clock and power domains in later stages of the integrated circuit design than allowed with earlier technologies.

6. The apparatus of claim 1, further comprising:
two or more initiator agents located within the interconnect network, where the hardware circuitry in the interconnect-power-manager and each of the initiator agents is configured to track the quiescent state of components and routing interdependencies of other power domains in the interconnect network needed to route a transaction between that initiator agent to other target and initiator cores connected to that initiator agent on a per power domain basis.

7. The apparatus of claim 1, where the hardware circuitry including status registers within the interconnect-power-manager handles the quiescing and waking up of the components within the interconnect network in the power domains, and the interconnect-power-manager also has signaling interfaces with the integrated-circuit-system-power-manager per power domain in order to coordinate power domain state transitions of each power domain separately from other power domains in the interconnect network.

8. The apparatus of claim 1, where the hardware circuitry in the interconnect-power-manager is configured to respond to an incoming transaction which cannot establish a path through the multiple power domains within the interconnect network from the initiator core to the final destination target core because one or more components in the path are quiesced, where the hardware circuitry causes the transaction to either be blocked at the initiator agent or errored out until a wakeup signal is enabled to wakeup the relevant power domains in the interconnect network including any intervening power domains in the interconnect network.

9. The apparatus of claim 1, where the hardware circuitry in the interconnect-power-manager includes multiple power domain controllers each with its own state machine to control a quiescing and waking up of the components within that power domain, and one power domain controller per power domain in the interconnect network, and one or more status registers located with each initiator agent that indicate the quiescent power state of each target agent and the quiescent power state of routers along the routing pathway from the initiator agent to the final target agent that have connectivity through routing pathways in the interconnect network with that initiator agent.

10. The apparatus of claim 1, where each initiator agent in the interconnect network has a tracking mechanism to track the quiescent state for each external power domain that this agent has connectivity with through routing pathways in the interconnect network, and also contains logic to know the power state of each interconnect network component internal to the power domain containing that initiator agent in order to know which particular interconnect network components need to be requested to be awakened; and where logic and a corresponding signaling interface are incorporated into each initiator agent structure to interface with the integrated-circuit-system-power-manager and to achieve when 1) a power domain is to be quiesced, 2) outstanding transactions are to be drained, and 3) additional transactions which use components belonging to the power domain are to be fenced at that initiator agent.

11. The apparatus of claim 1, where the interconnect-power-manager has the hardware circuitry integrated into the interconnect network to manage a quiescent state for all interconnect network components in each power domain when a routing pathway for transactions in the interconnect network spans across one or more power domain boundaries, where the interconnect-power-manager is configured to control transaction activity management within the multiple power domains within the interconnect network by sending one or more signals to quiesce or awaken interconnect network components contained within these multiple power domains, and the integrated-circuit-system-power-manager is configured to turn power on and off to the multiple power domains within the interconnect network, where the integrated-circuit-system-power-manager turns off power to a given power domain when all of the components within that given power domain in the integrated circuit are quiesced, where the interconnect-power-manager decouples transaction activity management in the multiple power domains from the integrated-circuit-system-power-manager's control of power management in order to allow interconnect network components to be contained in two or more power domains along with at least one of 1) an initiator Intellectual Property (IP) core, 2) a target IP core, and 3) any combination of both within each of those two or more power domains.

12. The apparatus of claim 1, where the interconnect-power-manager has the hardware circuitry integrated into the interconnect network to manage a quiescent state for all components in the interconnect network in each power domain when the routing pathway for transactions in the interconnect network spans across one or more power domain boundaries and causes interdependencies of power domains within the interconnect network other than the locations of the power domains containing a first initiator agent generating the new transaction and the final target agent of the new transaction, where the integrated-circuit-system-power-manager controls power management within the interconnect network by monitoring only status registers located within each of the initiator agents, where the status registers indicate a composite of the quiescent state for all interconnect network components including the initiator agents, target agents, and routers in each power domain in the interconnect network that have connectivity to that initiator agent.

13. The apparatus of claim 1, where the initiator agent has logic to monitor an outstanding status of each transaction received by that initiator agent, where the interconnect-power-manager is configured for power management flows to quiesce target agents a) by ensuring that all outstanding transactions to it from an initiator agent are returned b) by an initiator agent not generating new transactions to the target agent, once the quiesce request is received at the initiator agent, and c) by any combination of the two above; and where an appropriate subset of a connectivity matrix used in an initiator agent is configurable by a designer of the integrated circuit to indicate all of a plurality of target IP cores this initiator agent connects to and its routing pathway as well as an address map of a target and a plurality of IP cores coupling to the interconnect network, where the initiator agent locally stores its appropriate subset of the connectivity matrix.

14. The apparatus of claim 1, where the interconnect-power-manager has a) two or more power domain controllers to control a quiescing and waking up of the components within that power domain, one power domain controller for each power domain, an external interface with the integrated-circuit-system-power-manager and logic to support the external interface, and an internal interface for each power domain as well as b) the appropriate logic to broadcast a status of whether a request or response transaction has completed its traversing across the interconnect network, where the interconnect-power-manager includes the hardware circuitry integrated with the interconnect network including the two or more power domain controllers, interfaces, and logic that are configured to quiesce and wakeup power domains within the interconnect network by communicating with the hardware circuitry in the different agents in the multiple domains within the interconnect network.

15. The apparatus of claim 1, where the hardware circuitry in the interconnect-power-manager includes a state machine in each power domain controller in the interconnect-power-manager, where each state machine is configured to ensure that the quiescence flow begins only when all components in the power domain associated with that power domain controller are awake as indicated by status registers and a wakeup flow begins only when all components in the domain are quiesced as indicated by the status registers.

16. The apparatus of claim 1, where the hardware circuitry in the interconnect-power-manager includes two or more power domain controllers and each power domain controller has a state machine configured to send a signal to logic in each initiator agent to ensure that the quiescence flow begins only when all outstanding transactions are retired that are routed to or through components in the domain and to ensure that wake up of components in a power domain occurs when a transaction needs to traverse through that power domain, and where one or more status registers located with each initiator agent indicate the quiescent power state of the power domains within the interconnect network that have connectivity through the routing pathways in the interconnect network with that initiator agent.

17. A non-transitory machine-readable medium having data and instructions stored thereon, which, when executed by a machine, cause the machine to generate a representation of the apparatus of claim 1, wherein the non-transitory machine-readable medium stores an Electronic Design Automation (EDA) toolset used in a System-on-a-Chip design process that has the data and instructions to generate the representations of the apparatus.

18. A method of managing power in an integrated circuit; comprising:
cooperating and communicating signals between an interconnect-power-manager with an integrated-circuit-system-power-manager in an integrated-circuit, where an interconnect network is partitioned into multiple power domains and has hardware circuitry integrated into the interconnect network to manage a quiescent state for all components in each power domain in the interconnect network when a routing pathway for transactions in the interconnect network spans across one or more power domain boundaries and causes interdependencies of power domains within the interconnect network other than where the power domains of an initiator agent of a new transaction and final target agent of the new transaction are located within;
managing a power state of one or more initiator cores coupled to their own corresponding initiator agent and one or more target cores coupled to their own corresponding target agent with the integrated-circuit-system-power-manager which is separate from the interconnect-power-manager; and
where the integrated-circuit-system-power-manager is configured to cooperate and communicate with the interconnect-power-manager to quiesce, to wake up, and any combination of the two, one or more of the multiple power domains within the interconnect network, where each power domain is separately controllable from other power domains in the interconnect network by the interconnect-power-manager.

19. The method of claim 18, further comprising:
using status registers in each initiator agent in the interconnect network for one or more target agents in each power domain that the initiator agent connects to and using combinational logic to represent the power domains that the routers belong to in the routing pathway between the initiator agent and the final target agent within the interconnect network to indicate a power mode state regarding each power domain this initiator agent has connectivity with; and tracking and controlling a quiescent state for all components in each power domain when the routing pathway in the interconnect network from the initiator agent to the final destination target agent spans across the one or more power domain boundaries within the interconnect.

20. The method of claim 19, further comprising:

monitoring an outstanding status of each transaction received by a first initiator agent, where the interconnect-power-manager is configured for power management flows to quiesce target agents a) by ensuring that all outstanding transactions to it from the first initiator agent are returned b) by the first initiator agent not generating new transactions to the target agent, once the quiesce request is received at the first initiator agent, and c) by any combination of the two above.

21. An apparatus, comprising:

an interconnect-power-manager that has hardware circuitry and signaling ports configured to cooperate and communicate with an integrated-circuit-system-power-manager for an integrated circuit, where an interconnect network is partitioned into multiple power domains, and the interconnect-power-manager has the hardware circuitry integrated into the interconnect network to manage a quiescent state for all interconnect network components in each power domain, where the interconnect-power-manager is configured to cooperate with the integrated-circuit-system-power-manager to wake up two or more quiesced power domains in parallel upon an arrival of a new transaction needing to traverse a routing pathway in the interconnect network from an initiator agent to a final destination target agent, and the initiator agent is configured to cause the new transaction to wait at an initiator core during a wakeup period of the two or more power domains.

22. An apparatus, comprising:

an interconnect-power-manager that has hardware circuitry and signaling ports configured to cooperate and communicate with an integrated-circuit-system-power-manager as well as with multiple initiator agents within an interconnect network for the integrated circuit, where the interconnect network is partitioned into multiple power domains, and the interconnect-power-manager has the hardware circuitry integrated into the interconnect network to manage a quiescent state for all components in the interconnect network in each power domain when a routing pathway for transactions in the interconnect network spans across one or more power domain boundaries and causes interdependencies of power domains within the interconnect network other than the locations of the power domains containing a first initiator agent generating a new transaction and a final target agent of the new transaction, where the integrated-circuit-system-power-manager controls power management within the interconnect network by monitoring only status registers located within each of the initiator agents, where the status registers indicate a composite of the quiescent state for all interconnect network components including initiator agents, target agents, and routers in each power domain in the interconnect network that have connectivity to that initiator agent.

23. An interconnect-power-manager that has hardware circuitry and signaling ports configured to cooperate and communicate with an integrated-circuit-system-power-manager for an integrated circuit, comprising:

an interconnect network that is partitioned into multiple power domains, and the interconnect-power-manager has the hardware circuitry integrated into the interconnect network to manage a quiescent state for all interconnect network components in each power domain when a routing pathway for transactions in the interconnect network spans across one or more power domain boundaries, where the interconnect-power-manager is configured to control transaction activity management within the multiple power domains within the interconnect network by sending one or more signals to quiesce or awaken interconnect network components contained within these multiple power domains, and the integrated-circuit-system-power-manager is configured to turn power on and off to the multiple power domains within the interconnect network, where the integrated-circuit-system-power-manager turns off the power to a given power domain when all of the components within that given power domain in the integrated circuit are quiesced, where the interconnect-power-manager decouples transaction activity management in the multiple power domains from the integrated-circuit-system-power-manager's control of power management in order to allow the interconnect network components to be contained in two or more power domains along with at least one of 1) an initiator Intellectual Property (IP) core, 2) a target IP core, and 3) any combination of both within each of those two or more power domains.

* * * * *